(12) United States Patent
Matsunaga

(10) Patent No.: US 8,139,272 B2
(45) Date of Patent: Mar. 20, 2012

(54) IMAGE READING APPARATUS, CONTROL PROGRAM THEREOF, AND METHOD FOR DETERMINING OUTPUT RANGE OF IMAGE DATA READ BY THE APPARATUS

(75) Inventor: Keiichi Matsunaga, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1103 days.

(21) Appl. No.: 11/740,709

(22) Filed: Apr. 26, 2007

(65) Prior Publication Data

US 2007/0253036 A1 Nov. 1, 2007

(30) Foreign Application Priority Data

Apr. 28, 2006 (JP) ................................ 2006-126980

(51) Int. Cl.
*H04N 1/04* (2006.01)
(52) U.S. Cl. ........................ 358/474; 358/1.16; 358/1.17
(58) Field of Classification Search ................. 358/1.16, 358/1.17, 474
See application file for complete search history.

(56) References Cited

U.S. PATENT DOCUMENTS

| 7,724,400 B2 * | 5/2010 | Cousins et al. ............... 358/474 |
| 2003/0231355 A1 * | 12/2003 | Ishikawa et al. .............. 358/474 |

FOREIGN PATENT DOCUMENTS

| JP | H04-322558 A | 11/1992 |
| JP | H09-281754 A | 10/1997 |
| JP | H10-098609 A | 4/1998 |
| JP | 2000-168975 A | 6/2000 |
| JP | 2001-337662 A | 12/2001 |
| JP | 2003-219122 A | 7/2003 |

OTHER PUBLICATIONS

Steve Johnson Show Me Microsoft® Office Powerpoint® 2003 Pub. Date: Oct. 2, 2003 Print ISBN-10: 0-7897-3009-X p. 55,207,208,330,331,412.*
Japan Patent Office, Notification of Reason for Refusal for Japanese Patent Application No. 2006-126980 (counterpart to above-captioned patent application), dispatched Mar. 15, 2011.

* cited by examiner

*Primary Examiner* — Benny Tieu
*Assistant Examiner* — Qian Yang
(74) *Attorney, Agent, or Firm* — Baker Botts L.L.P.

(57) ABSTRACT

An image reading apparatus includes: a reading device for reading an image of a document; a moving mechanism; an operable portion capable of being inputted a specific command; a read-controlling portion for conducting a reading operation so as to obtain sections of the image data of the document in a reading order; a display device configured for displaying a display image of the document; a display-controlling portion for controlling the display device so as to display the display image based on the sections of the image data; a command detecting portion for detecting the specific command; an output-range determining portion for determining an output range which is determined based on the sections of the image data corresponding to the display image displayed when the specific command is detected; and an image-data outputting portion for outputting the output image data based on the output range.

16 Claims, 7 Drawing Sheets

IMAGE READING APPARATUS, CONTROL PROGRAM THEREOF, AND METHOD FOR DETERMINING OUTPUT RANGE OF IMAGE DATA READ BY THE APPARATUS

CROSS-REFERENCE TO RELATED APPLICATION

The present application claims priority to and the benefit of Japanese Patent Application No. 2006-126980, filed on Apr. 28, 2006, the contents of which are hereby incorporated by reference.

BACKGROUND OF THE INVENTION

1. Field of the Invention

The present invention relates to an image reading apparatus, a control program thereof and a method for reading image, and more particular to an image reading apparatus, a control program thereof, and a method for reading image, which are capable of easily determining an output range of the image data which has been read.

2. Discussion of Related Art

In an image reading apparatus such as a fax machine, a copy machine, and a scanner, there are provided an operation key or operation keys and a display portion. An operator operates the image reading apparatus by operating the operation keys and recognizes an operational state in the display portion. Once the image reading apparatus starts to read an image of a document owing to the operation of the operation keys by the operator, the image data of the document which has been read therefrom (i.e., output data) is outputted to an image-data receiving device.

In a case in which the image reading apparatus is the fax machine as a sender, the image-data receiving device is the other fax machine as a receiver which is connected to the sender via a line. In this case, the image data which has been read is transmitted by the sender to the receiver via the line. In a case in which the image reading apparatus is the copy machine, the image-data receiving device is a printer which is provided therein. In this case, the image data which has been read is outputted by the printer, namely, the image based on the image data which has been read from the document is recorded on a recording sheet by the printer. Further, in a case in which the image reading apparatus is the scanner, the image data which has been read is outputted to a personal computer (hereinafter, abbreviated as a "PC") as the image-data receiving device. The image based on the image data which is inputted into the PC is recorded by a printer which is connected to the PC, or, the image data is written into a memory medium.

In recent years, as disclosed in Japanese Unexamined Patent Application Publication Nos. JP-A-2001-337662, JP-A-2003-219122, and JP-A-10-98609, there has been proposed an image reading apparatus in which an image based on image data which has been read from a document is displayed on a display portion that is provided integrally with or independently of the image reading apparatus, so that the image data which has been read can be recognized or confirmed.

SUMMARY OF THE INVENTION

In the fax machine and the copy machine, a reading operation of the image data and an outputting operation of the read image data to the image-data receiving device are performed per one document. However, in this arrangement, there has been a problem that the image data read from the whole document is outputted to the image-data receiving device even if the image data based on a needless portion of the image of the document is included. More specifically, in the above-described image reading apparatus, since the reading operation and the outputting operation are performed on the needless image of the document as well as a needed portion of the image thereof, it takes a long time for the image reading apparatus to finish performing a whole operation of the apparatus. Also, in the image-data receiving device, it uselessly takes a long time to perform a receiving operation in which the image data is received and also a record operation since needless image data has to be received. Further, the recording sheet and ink, etc, are wastefully consumed in the image-data receiving device.

In a case in which a handy scanner is adopted as the image reading apparatus, it is possible to partially read the image of the document, namely, it is possible to determine a range of the image to be outputted, based on the image data which has been partially read from the document, owing to commands of the operator to start and finish the reading operation. However, since the handy scanner needs to be manually moved by the operator to read or scan the image, accuracy of the reading operation on the image is low. Therefore, by the handy scanner, it is hard to obtain the image data in high quality. More specifically, the operator needs to manually move the handy scanner on the document, and at the same time, to visually identify or check which part of the document is currently read and which part of the document needs to be read. Therefore, the operator is required to be highly skilled in terms of manually performing the reading operation in order to obtain the image data in high quality.

In each of the image reading apparatuses disclosed in the Japanese Unexamined Patent Application Publication Nos. JP-A-2001-337662, JP-A-2003-219122, and JP-A-10-98609, there is provided a display portion for sequentially displaying the image based on the image data that has been read, whereby the operator can visually identify, on the display portion, which part of the image of the document is currently read. However, the above-described image reading apparatuses disclosed in the above-mentioned publications can not satisfy the needs of partially reading the image data and performing the reading operation with high accuracy, namely, can not partially read the image from the document as the image data with high quality.

The present invention has been made in view of the situations discussed above. It is therefore an object of the present invention to provide an image reading apparatus, a control program thereof, and a method for reading the image data, which are capable of easily determining an output range of the image data which has been read.

In order to achieve the above-described object, an image reading apparatus according to the present invention comprises: a reading device configured to read an image of a document; a moving mechanism configured to move at least one of the reading device and the document; an operable portion capable of being inputted a specific command; a read-controlling portion configured to conduct a reading operation in which the reading device reads the image of the document while scanning the document by controlling operations of the reading device and the moving mechanism so as to obtain sections of the image data of the document in a reading order sequentially; an image-data storing portion configured to store, in a memory, the sections of the image data of the document in a reading order sequentially; a display device configured to display a display image of the document; a display-controlling portion configured to control the display device so as to display the display image based on the sections of the image data in a manner that parts of the display image respectively corresponding to the sections of the image data displayed in the reading order sequentially such that the image of the document appears on the display device; a command detecting portion configured to detect the specific command; an output-range determining portion configured to determine an output range which is a range of output image data to be outputted from the image reading apparatus, the output range being determined based on the sections of the image data corresponding to the display image displayed at a timing when the specific command is detected by the command detecting portion; and an image-data outputting portion configured to output the output image data based on the output range.

Further, in order to achieve the above-described object, a control program for an image reading apparatus according to the present invention comprises: an image-data storing step of storing, in a memory, the sections of the image data of the document in a reading order sequentially; a displaying step of displaying the display image based on the sections of the image data in a manner that parts of the display image respectively corresponding the sections of the image data displayed in the reading order sequentially such that the image of the document appears on the display device; a command detecting step of detecting the specific command; an output-range determining step of determining an output range which is a range of output image data to be outputted from the image reading apparatus, the output range being determined based on the sections of the image data corresponding to the display image displayed at a timing when the specific command is detected; and an image-data outputting step of outputting the output image data based on the output range.

Further, in order to achieve the above-described object, a method for reading an image by using an image reading apparatus according to the present invention comprises: storing, in a memory, the sections of the image data of the document in a reading order sequentially; displaying the display image based on the sections of the image data in a manner that parts of the display image respectively corresponding the sections of the image data displayed in the reading order sequentially such that the image of the document appears on the display device; detecting the specific command; determining an output range which is a range of output image data to be outputted from the image reading apparatus, the output range being determined based on the sections of the image data corresponding to the display image displayed at a timing when the specific command is detected; and outputting the output image data based on the output range.

According to the above-described image reading apparatus, the above-described control program, and the above-described method in the present invention, the image data of the document which is read by the reading device is stored in the memory. Then, the image based on the image data which is stored in the memory is displayed on the display device one by one in a predetermined order. More strictly, in the reading operation, the reading device reads the image of the document while scanning the document so as to obtain sections of the image data of the document in the reading order sequentially. Then, the sections of the image data of the document are stored in a memory in a reading order sequentially. The display image based on the sections of the image data is displayed in the manner that the parts of the display image respectively corresponding to the sections of the image data displayed in the reading order sequentially such that the image of the document appears on the display device. When the specific command is detected, the output range which is the range of output image data to be outputted from the image reading apparatus is determined. The output range is determined based on the sections of the image data corresponding to the display image displayed at the timing when the specific command is detected. Accordingly, the output image data based on the output range is outputted. When the specific command which is inputted via the operable portion is detected, the output range of the image data (the output data) which is to be outputted is determined, based on the image displayed on the display device at a timing when the specific command is detected. Since the image displayed on the display device is momentarily changed, a range of the image data which is needed by the operator can be determined as the output range when the specific command is inputted via the operable portion by the operator at a timing when the image which is needed by the operator is displayed in the display device.

Therefore, a desired range of the image data can be selected by the operator within the image data of the image of the document so as to be outputted, whereby it is possible to avoid a situation in which needless image data is wastefully outputted. In other words, there will be no deficiency that the image data of the whole document is outputted despite the fact that the image data which is needed by the operator to be outputted is based on only a part of the document. Owing to this arrangement, it is possible to shorten a required time to output the image data to an image-data receiving device, thereby making it possible to effectively perform the outputting operation.

Further, since the image based on the image data of the document which has been read is dynamically displayed, it is possible for the operator to easily determine the output range of the image data by judging a timing to operate the operable portion (i.e., by inputting the specific command). When the output range of the image data is to be determined in a case in which the image data of the document which has been read is statically displayed, the following three operations will be required: an operation for displaying a cursor onto a screen of the display device; an operation for moving the cursor in connection with an operation of the operable portion; and an operation for determining a cursor position by recognizing a predetermined operation of the operable portion (which is different from the operation for moving the cursor). However, according to the image reading apparatus, the control program, and the method in the present invention, the above-described three operations can be omitted. Therefore, as compared with the case in which the image data of the document which has been read is statically displayed, it is possible to simplify a construction of the image reading apparatus, the control program and the method and to effectively and easily determine the output range of the image data. Further, since the operator is not required to perform operations for moving and positioning the cursor, the operation of the operable portion which is required for the operator to perform can be simplified. Therefore, workability can be increased.

Further, the display device is disposed on the external surface of the image reading apparatus in a vicinity of the operable potion. In this arrangement, the operator can stay at a same position (at a position in which the image reading apparatus is placed) to perform an operation for performing the reading operation (e.g., an operation for setting the document to the image reading apparatus) and an operation for editing the image data which has been read (i.e., a determination of the output range of the image data). Therefore, as compared with a general image reading apparatus having a construction in which the image data that has been read is outputted therefrom to the image-data receiving device such as a personal computer, etc, in which the output range of the image data is determined, the present image reading apparatus assures the operator for reduced works or efforts to come and go between the image reading apparatus and the image-data receiving device, thereby making it possible to effectively and labor-savingly perform the reading operation on the document. Further, if the display device is arranged to be disposed in the vicinity of the operable potion, the operator can easily operate the operable portion by confirming the display of the display device.

Further, the reading device and the document are moved relative to each other by the moving mechanism, thereby making it possible to stably perform the reading operation while partially reading the document, as compared with the handy scanner. Therefore, quality of the image data which has been read can be increased as compared with quality of the image data read by the handy scanner, whereby it is possible to satisfy both of the needs for partially reading the document as the image data and for reading the image data in high image quality.

It is noted that the image reading apparatus, the control program, and the method according to the present invention can be configured such that a range of the image data corresponding to the image which is displayed at a timing when the specific command is detected (inputted) is to be determined as the output range (determination of an end margin of the output range). Also, the image reading apparatus, the control program, and the method according to the present invention can be configured such that a range of the image data, except a range of the image data corresponding to the image which is displayed at the timing when the specific command is detected (inputted), is to be determined as the output range (determination of an beginning margin of the output range). Also, the operable portion is not limited to be operated one time, but may be operated a plurality of times. For instance, two operations of the operable portion (each for inputting a command) may be set as a pair. In this arrangement, a range of the image data of the image displayed from a timing when a first command is detected till a timing when a second command is detected is to be determined as the output range.

FORMS OF THE INVENTION

The above-described image reading apparatus according to the present invention may be embodied in various forms described below.

In a first form of the image reading apparatus according to the present invention, the display-controlling portion is configured to display, on the display device, each of the parts of the display image at substantially the same time when one of the sections of image data corresponding to the each of the parts of the display image is obtained by the reading operation of the document.

According to the first form of the image reading apparatus, it is easy for the operator to recognize a position of the document to which the reading operation has been performed.

In a second form of the image reading apparatus according to the present invention, the output-range determining portion is configured to determine the output range as a range of the sections of the image data which ranges from one of the sections of the image data corresponding to one of the parts of the display image displayed last on the display device at the timing when the specific command is detected, to another one of the sections of the image data obtained first by the reading operation of the document.

According to the second form of the image reading apparatus, since there is no need for the operator to specify the beginning margin, the output range is determined by only operating the operable portion at a timing when the image based on the image data having a desired end margin is displayed (it is because the specific command is inputted by operating the operable portion).

In a third form of the image reading apparatus according to the present invention, the read-controlling portion is configured to stop the reading operation at the timing when the specific command is detected and establish one of (a) a state before the reading operation starts to be performed on the document and (b) a state in which the reading operation is performable on a following document that is planned to be read after the document, by activating the moving mechanism to move at least one of the reading device and the document in which the reading operation is stopped.

According to the third form of the image reading apparatus, when the output range is determined by the detection of the specific command, namely, when the reading operation has been already completed on the image data of a portion of the document which is to be outputted to the image-data receiving device, the reading operation on the rest portion of the document can be stopped. Owing to this form, a needles reading operation on the image data which is irrelevant to the output range can be reduced or cut down, thereby making it possible to shorten a required time to perform the whole operation in the image reading apparatus.

Further, owing to the image reading apparatus according to the above-described first and third form, a movement of the reading device can be stopped, by synchronizing the display on the display device with the reading operation on the document, at a timing when the operator operates the operable portion since the display on the display device is linked with the reading operation on the document. That is, the reading operation on the document can be stopped immediately when the reading operation has been completed on a part of the document in which the image data is needed by the operator. Therefore, it is possible to effectively perform the reading operation on the document by cutting down the needless portion thereof (an excessive reading operation). Further, by cutting down the needless portion of the reading operation (the excessive reading operation), it is possible to avoid that the needless image data is stored in the memory in spite of the fact that an amount of the image data tends to be huge in general. Accordingly, the amount of the image data to be stored can be reduced. Therefore, it is possible to restrain a situation in which a storage area of the RAM installed in the image reading apparatus is encroached. It is also possible to avoid a situation in which the image data can not be stored because the memory is full.

In a fourth form of the image reading apparatus according to the present invention, the image reading apparatus is configured to be capable of outputting the output image data to a plurality of image-data receiving devices each of which is capable of receiving the output image data, and which further comprises a receiving-device assigning portion configured to select one of the plurality of image-data receiving devices to which the output image data is outputted from the image reading apparatus.

According to the fourth form of the image reading apparatus, the operator simply performs an operation for determining the output range of the image data without performing an operation for outputting the output data other than the operation for determining the output range of the image data, whereby it is possible to output the output data to the one of the plurality of image-data receiving devices. Generally, the image data which has been read is converted to be something meaningful for the operator by being outputted in some ways. Therefore, most of the operators want to output the image data which has been read. Accordingly, there is no disadvantage for the operator even if the operation for outputting the output data is triggered by the operation for determining the output range of the image data is performed.

In a fifth form of the image reading apparatus according to the present invention, the read-controlling portion is configured to stop the reading operation at the timing when the specific command is detected and establish a state in which the reading operation is performable on a following document that is planned to be read after the document, by activating the moving mechanism to move at least one of the reading device and the document in which the reading operation is stopped, and wherein the read-controlling portion includes a read-resuming controlling portion configured to conduct the reading operation on the following document after the state is established.

According to the fifth form of the image reading apparatus, the reading operation can be automatically performed with respect to a plurality of the documents.

The fifth form of the image reading apparatus can be arranged to comprise a document-introducing mechanism provided in the moving mechanism and configured to introduce documents each as the document one by one to a reading start position at which the reading operation is started and a final-document detecting device configured to detect whether the document which is to be introduced to the reading start position by the document-introducing mechanism is a final document. In this arrangement, the read-resuming controlling portion is configured to conduct the reading operation on the following document under a condition in which the document that is to be introduced to the reading start position is not detected as the final document by the final-document detecting device.

According to the above-described arrangement, it is possible to reliably perform reading on the plurality of documents by starting to perform the reading operation on the following document when the following document is present in a case in which the reading operation is stopped on the document which has been read just before the following document.

Further, in the reading operation on the following document, there is no need for the operator to manually set the following document since each of the documents is automatically introduced by the document-introducing mechanism, thereby making it possible for the operator to reduce a task in the reading operation. Further, as compared with a case in which the operator is required to manually set the following document, it is possible to shorten an interval after the reading operation on the document which has been read just before the following document is stopped until the reading operation on the following document is started since it is possible to sequentially perform processings from stopping the reading operation on the document which has been read just before the following document to starting the reading operation on the following document, by introducing said each of the documents by the document-introducing mechanism.

Further, the fifth form of the image reading apparatus can be arranged such that the image-data storing portion is configured to keep the sections of the image data stored in a memory when the reading operation is stopped and to store, in the memory, the sections of the image data which is obtained by the reading operation on the following document so as to be continuous with the sections of the image data kept in the memory.

According to the above-described arrangement, the image data of the following document is sequentially stored with the end margin of the image data of the document in which the output range is determined by the output-range determining portion (the document on which the reading operation is stopped by the detection of the specific command, namely, the document just before the following document), whereby the image data of a part of the document which has not been read (a part of the document just before the following document) is not stored in the memory. Further, the image data of the part of the document which has not been read is not required to be stored as a blank. Further, the image data of a plurality of documents to be stored in the memory can be sequentially processed as a series of the image data even though each of the image data to be stored in the memory has been read from different documents, thereby making it possible to increase a property of the image data in processing. Accordingly, it is possible to increase a throughput speed.

It is noted that in the above-described arrangement, the image-data outputting portion is configured to output, as the output image data, the sections of the image data stored in the memory, after the reading operation on the document which is a final document is completed.

According to the above-described arrangement, it is possible to perform the reading operation on the plurality of documents and output the image data which have been read therefrom to the image-data receiving device, with accuracy, since outputting the image data to the image-data receiving device is triggered by finishing the reading operation on the final document.

Further, the image data whose output range is determined by the output-range determining portion (i.e., the image data including image data which has been read from a part of the document on which the reading operation is stopped due to the specific command) is stored in the memory. The image data of the following document is stored sequentially with the end margin of the output range of the image data. That is, the image data is stored in the memory so as to be processed as one sequential image data. Therefore, it is possible to transmit the image data which have been read from the plurality of documents as the one sequential image data and to easily control a transmission, where outputting image data to a communication device such as a facsimile that is connected (to the image reading apparatus) via the line is triggered by finishing the reading operation on the final document.

Further, when the image-data receiving device is configured to record the image data on the recording medium or to write the image data into the memory medium, it is possible to effectively utilize the recording/memory medium and to save the amount (or data amount) thereof since the image data which has been down-sized by deleting the needless blank data can be recorded on or written into the recording/memory medium.

Further, the fifth form of the image reading apparatus can be arranged such that the display-controlling portion is configured to display, on the display device, the display image of the following document in a vicinity of the display image displayed with respect to the document on which the reading operation has been performed when the reading operation is performed on the following document, and such that the display-controlling portion is configured to display, on the display device, the display images of the following document so as to be continuous with the display image displayed with respect to the document on which the reading operation has been performed when the reading operation is performed on the following document.

According to the above-described arrangements, it is possible to avoid a situation in which the wasteful blank image (based on the blank data of the part of the document in which the no image data is read) is displayed on the display device so as to be interposed between the image of the following document and the image of the document (which is read just before the following document). Accordingly, the image can be displayed on the display device in a visually good condition.

Generally, means for displaying the image based on the image data which has been read is configured so as to display the image whose size corresponds to the document size, and so as to display the blank image based on the blank data of the part of the document in which the no image data is read. If this configuration is applied to the image reading apparatus, the blank image is to be displayed when the reading operation is stopped as described above because there is no image data to be displayed which is based on the part of the document on which the reading operation is not performed. In this configuration, the blank image is interposedly displayed between the image of the document and the image of the following document. In some cases, the image of the document and the image of the following document are displayed so as to be widely separated from each other. In this case, an amount of the data which can be visually identified by the operator at once is decreased when the operator confirms the image, on the display device, based on the image data which has been read. Further, it is highly difficult for the operator to grasp continuity of the image data (bad visibility).

However, in the above-described arrangements, the images of the following document are displayed on the display device, in a vicinity of, or sequentially with, the image displayed with respect to the document. Therefore, it is possible to increase the amount of the data which can be visually identified by the operator at once and to easily grasp or identify, by the operator, the continuity of the image data, as compared with the above-described configuration in which the image is simply displayed such that size of the image corresponds to the document size.

A sixth form of the image reading apparatus according to the present invention comprises a range-modification-information detecting portion configured to detect a range-modification information which is inputted via the operable portion in order to modify the output range; and an output-range modifying portion configured to modify the output range by deleting or adding at least one of the section of the image data which is specified by the range-modification information from or to the sections of the image data which is stored in the memory when the range-modification information is detected by the range-modification-information detecting portion.

According to the sixth form of the image reading apparatus, it is possible to modify the output range which has been determined by inputting the range-modification information after the output range is determined by the output-range determining portion. Owing to this arrangement, it is possible to satisfy the need of the operator in a case in which the operator desires to modify the output range after the output range is determined by the output-range determining portion by reviewing the output range which has been determined.

Particularly, in the image reading apparatus, by inputting the specific command by the operator when the desired image is displayed on the display device on which the image is momentarily changed, the output range is determined based on the image data whose image is displayed at a timing when the specific command is inputted by the operator. Therefore, the output range may not be correctly determined when the specific command is inputted by the operator at a different timing from the timing when the desired image is displayed. However, in this arrangement, since the output range which has been determined by the output-range determining portion can be modified by inputting the range-modification information such that the need of the operator is satisfied, it is possible to finally determine the output range as desired by the operator by modifying the output range in a case in which the output range which has been determined by the output-range determining portion does not satisfy the need of the operator.

Where the modification of the output range is performed by the output-range modifying portion, it is possible to reliably output the image data whose output range is determined as desired by the operator to the image-data receiving device since the image data which corresponds to the output range that is modified is outputted by the image-data outputting portion. It is noted that the image data whose output range is modified may be stored in the memory instead of the image data whose output range has been determined by the output-range determining portion where the output range is modified by the output-range modifying portion.

It is noted that the above-described sixth form of the image reading apparatus may be arranged such that the output-range determining portion is configured to determine the output range as a range of the sections of the image data which ranges from one of the sections of the image data corresponding to one of the parts of the display image displayed last on the display device at the timing when the specific command is detected, to another one of the sections of the image data obtained first by the reading operation of the document, and such that the output-range modifying portion is configured to modify the output range by modifying said one of the sections of the image data corresponding to said one of the parts of the display image.

Further, the above-described sixth form of the image reading apparatus may be arranged such that the display-controlling portion includes a display-modifying portion configured to display at least one of the parts of the display image displayed on the display device which corresponds to the at least one of the section of the image data that has been deleted, in a different manner from the other of the parts of the display image displayed on the display device, when the at least one of the section of the image data is deleted from the sections of the image data stored in the memory by the output-range modifying portion.

According to the above-described arrangement, it is easy for the operator to easily recognize the output range of the image data after the image data of the at least one of the sections is deleted.

For example of the above-described arrangement, there may be adopted displaying in a different color, or, displaying with a different font type or a different background color thereof. Further, the above-described part of the image may be black out or not displayed.

BRIEF DESCRIPTION OF THE DRAWINGS

The above and optional objects, features, and advantages of the present invention will be better understood by reading the following detailed description of a preferred embodiment of the invention when considered in conjunction with the accompanying drawings, in which.

DETAILED DESCRIPTION OF THE PREFERRED EMBODIMENT

Hereinafter, there will be described a preferred embodiment of the present invention by reference to the drawings, FIG. 1 to FIG. 7C. It is to be understood that the present invention is not limited to the details of a present embodiment to be illustrated hereinafter, but may be embodied with various changes and modifications without departing from the substance of the present invention.

Figure 1:
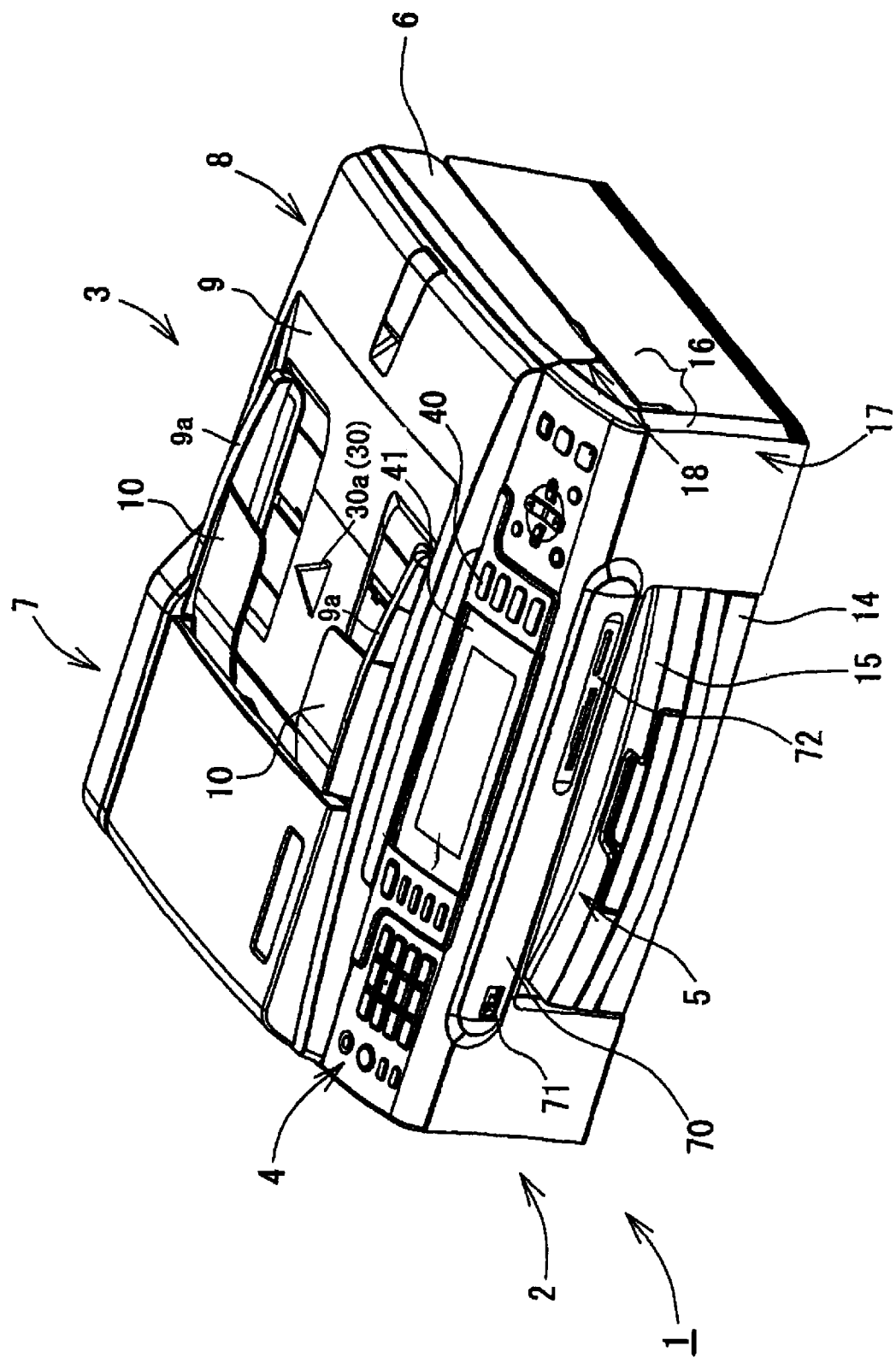
FIG. 1 is a perspective view showing an exterior construction of an image reading apparatus as an embodiment of the present invention.

FIG. 1 is a perspective view showing an exterior construction of a Multi Function Device (MFD) 1 as one embodiment of an image reading apparatus according to the present invention. As shown in FIG. 1, the MFD 1 as an MFP (a Multi Function Peripheral or a Multi Function Printer) is integrally constituted by a printer 2 which is provided in a lower portion thereof, a scanner 3 (i.e., a reading device) which is provided in an upper portion thereof, and an operation panel 4 which is provided on a front face of the scanner 3. The MFD 1 has a printer function, a scanner function, a copier function, and a facsimile function.

The MFD 1 which is connected to a computer (not shown) mainly records an image or a text onto a recording sheet as a recording medium based on image data or text data, respectively, each of which is transmitted from the above-described computer. Further, the MFD 1 can be connected to an external device such as a digital camera and record an image onto the recording sheet, based on image data which is outputted from the external device, and can be loaded with various memory medium such as a memory card and record an image onto the recording sheet, based on image data and so on which are stored in the memory medium. Needless to say, the MFD 1 can record the image onto not only the recording sheet, but also a transparent film sheet for OHP, a cloth, and so on.

The MFD 1 is configured to perform a reading operation by reading a document and to perform an outputting operation by outputting, to an assigned image-data receiving device, the image data which is read from the document. In the MFD 1, the reading operation on the document which is currently read pauses when a halt key or pause key 40B1 (shown in FIG. 2) is pressed down. Then, the document is discharged by activating a later-described ADF 7 where the ADF 7 is used in the MFD 1, or, a reading head is moved back to a predetermined position as a home position where the MFD 1 functions as a later-described FBS. Further, in the MFD 1, when the pause key 40B1 is pressed down so that the reading operation pauses, the image data which has already been read, i.e., the image data of the image of a part of the document, is not deleted but kept and outputted to the image-data receiving device which is assigned based on a mode of the functions (selected one of the printer function, the scanner function, and the facsimile function) in operation. In other words, the MFD 1 is configured to be capable of reading and outputting the image data of the image of the part of the document, and to be capable of finishing the reading operation on the document when the reading operation on a required part of the document is completed (i.e., to be capable of finishing the reading operation on the document before the image data of a whole image thereof is read.)

The scanner 3 for reading the image of the document includes a document reading bed 6 which functions as the Flatbed Scanner (FBS) and a document cover 8 which is provided so as to cover the document reading bed 6, which is attached to the document reading bed 6 so as to be freely opened and closed via a hinge provided at a rear side thereof, and which has an Auto Document Feeder (ADF) 7. Below the document cover 8, there is disposed the document reading bed 6 which has a generally rectangular parallelepiped shape that laterally extends in a plan view and that has a predetermined height, and which is to be covered by the document cover 8 that can be opened and closed. The document cover 8 has substantially the same shape as the document reading bed 6 in a plan view. Further, in the scanner 3, the document reading bed 6 and the document cover 8, as a whole, have a shape of generally rectangular parallelepiped.

In the document reading bed 6, there is provided a platen glass which has an oblong rectangle shape that has a widthwise dimension thereof longer than a lengthwise dimension thereof in the plan view and which is set in an upper portion of the document reading bed 6. The lengthwise dimension of the document reading bed 6 in the plan view is arranged so as to correspond to a width of a short side of a letter-size document, and the widthwise dimension of the document reading bed 6 in the plan view is arranged so as to correspond to a length of a long side of an A4-size document. Therefore, the image data is readable from both of the letter-size document and the A4-size document.

Inside of the document reading bed 6, an image-reading unit is provided. Also, inside of the document reading bed 6, there is secured a space in which the image-reading unit is moved and in which the image-reading unit, members for supporting the image-reading unit, and a mechanism for driving the image-reading unit are disposed. Therefore, the document reading bed 6 is larger than the platen glass.

When the scanner 3 having the above-described construction functions as the FBS, initially, the document cover 8 is opened such that the document is placed on the platen glass, namely, placed on the upper portion of the document reading bed 6. Subsequently, the document cover 8 is closed such that the document is interposed between an upper surface of the platen glass and a lower surface of the document cover 8. Then, the above-described image-reading unit is moved along a lower surface of the platen glass (i.e., a surface which is opposite to the upper surface thereof) when a command to start the reading operation is inputted. Owing to the above-described arrangement, the reading operation is performed on the document by the FBS.

The above-described image-reading unit has a line image sensor which extends in a forward and backward direction of the MFD 1 as a main scanning direction and which reads the image in the following manner: a) in the line image sensor, light is radiated onto the document, b) reflected light is led from the document to a photoelectric conversion element via a lens, and c) electric information is outputted from the photoelectric conversion element in accordance with intensity of the reflected light. As the line image sensor, a contact type image sensor, i.e., CIS (Contact Image Sensor), a Charge Coupled Device (CCD) which belongs to a contraction optical system, a CMOS (Complementary Metal-Oxide Semiconductor), etc., can be adopted. It is noted that inner constructions of the image-reading unit and the scanner 3 will not be described in detail in the present embodiment since the inner constructions of the image-reading unit and the scanner 3 are not directly related to the present invention.

The ADF 7 is configured so as to carry the document from a document-supply tray 9 to a document-discharge tray 10 via a document-feed path. In a process of feeding the document by the ADF 7, when the document is passed a predetermined position, i.e., a reading position, on the platen glass provided on the document reading bed 6, the image of the document is read by the above-described image-reading unit which stands by below the reading position. In other words, in contrast with the FBS, the ADF 7 performs the reading operation on the document by setting the image-reading unit at the predetermined position (the reading position) and carrying the document. The above-described reading operation by the ADF 7 is performed in a state in which the document cover 8 is closed so as to cover the document reading bed 6. It is noted that the ADF 7 will not be described in detail because the ADF 7 may be constructed in various ways in the present embodiment.

The document-supply tray 9 is configured such that a plurality of documents can be accommodated therein. Further, the document-supply tray 9 includes a pair of guides 9*a*, 9*a* for guiding the documents toward the inside of the MFD 1 when the ADF 7 is activated so as to feed the document being set on the document-supply tray 9 toward the inside of the MFD 1. Each of the pair of guides 9*a*, 9*a* is configured so as to be slidable in a direction (i.e., the forward and backward direction of the MFD 1) perpendicular to a direction in which the document is fed. A distance between the pair of guides 9*a*, 9*a* is adjusted to a width (a short side) of the document which is to be fed. Between the pair of guides 9*a*, 9*a*, there is provided a document detect sensor 30 which is to be covered by the document being set on the document-supply tray 9.

The document detect sensor 30 for detecting a presence or an absence of the document includes a movable piece 30*a* (i.e., a final-document detecting device) and an electric contact. The movable piece 30*a* is upwardly biased by a biasing member so as to project from the document-supply tray 9 and movable in an upward and downward direction. The electric contact is located below the movable piece 30*a*. When at least one document is set on the document-supply tray 9, the movable piece 30*a* is pressed down due to a weight of the at least one document. Accordingly, the electric contact is turned "ON" (the document detect sensor 30 is turned "ON".) On the other hand, when the document is removed from the document-supply tray 9, the movable piece 30*a* is moved up owing to a biasing force of the biasing member. Accordingly, the electric contact is turned "OFF" (the document detect sensor 30 is turned "OFF".) Therefore, the presence or absence of the document is detected by judging whether the document detect sensor 30 is turned "ON" or "OFF."

Further, the document detect sensor 30 detects a presence of a document (i.e., a following document) to be fed right after the document which is currently read, i.e., the document which has been fed into the inside of the MFD 1. The movable piece 30*a* is located at a position in which the movable piece 30*a* does not contact with a trailing end of the document which has been fed into the inside of the MFD 1. In other words, in an initial condition in which the at least one document is set in the document-supply tray 9, the document detect sensor 30 is turned "ON" (detection of the presence of the following document) because the movable piece 30*a* is pressed down by the at least one document. When the command to start the reading operation is inputted, a driving system such as a picking roller (not shown) provided in the ADF 7 is activated. Then, an uppermost one of the at least one document accommodated in the document-supply tray 9 is guided to the reading position located in the MFD 1. Since an end margin of the document being set at the reading position is moved to the position in which the movable piece 30*a* does not contact therewith, the movable piece 30*a* is moved up and the document detect sensor 30 is turned "OFF" (detection of the absence of the following document) when there is no next document in the document-supply tray 9.

The ADF 7 having the above-described configuration functions as a document-introducing mechanism provided in the moving mechanism and configured to introduce documents each as the document one by one to a reading start position at which the reading operation is started. Further, the document-detect sensor 30 functions as a final-document detecting device which is configured to detect whether the document which is to be introduced to the reading start position by the document-introducing mechanism is a final document.

The printer 2 is an image recording apparatus adopting an ink-jet process (hereinafter, referred to as "an ink-jet recording apparatus") in which the image is recorded onto the recording sheet by selectively ejecting ink droplets based on the image data which has been read by the scanner 3 or the image data which has been inputted from an external device. As described above, the printer 2 is disposed below the scanner 3. A back face of the MFD 1 is a flat surface without having unevenness because the scanner 3 and the printer 2 are positioned such that a back face of the scanner is continuous with a back face of the printer 2. It is noted that the printer 2 is not limited to adopt the ink-jet process, but may adopt various image recording processes such as an electrographic process, a thermo electric process, and so on.

An opening 5 is formed on a front face of the MFD 1, namely, on a front face of the printer 2. Inside of the opening 5, there are provided a sheet-supply tray 14 and a sheet-discharge tray 15. The sheet-supply tray 14 and the sheet-discharge tray 15 are disposed so as to have a two-tier structure in a vertical direction, namely, the sheet-discharge tray 15 is disposed on the sheet-supply tray 14. In the sheet-supply tray 14, the recording sheets which have a rectangle shape are accommodated such that a longitudinal direction of the recording sheets corresponds to the forward and backward direction of the MFD 1 in the plan view. A widthwise dimension of the sheet-supply tray 14 is adjusted to a width of a short side of a letter-size sheet and a lengthwise dimension is adjusted to a length of a long side of an A4-size sheet such that both of the letter-size sheet and the A4-size sheet are usable as the recording sheet.

As described above, the document reading bed 6 has an oblong rectangle shape. On the front side of the scanner 3, an end face 18 is formed by a front face of the document reading bed 6 and the front face of the document cover 8 such that the front face of the document reading bed 6 is even with the front face of the document cover 8. An end face 17 formed on the front side of the printer 2 forwardly protrudes from the end face 18 at a predetermined distance as measured in the forward and backward direction. An external shape of the MFD 1 is substantially square in the plan view. Hereinafter, a portion of the printer 2 which protrudes forwardly from the scanner 3 and which has a depth corresponding to the above-described distance between the end face 17 and the end face 18 in the forward and backward direction is referred to a protruding portion 16.

As described above, the document reading bed 6 is formed in a size that permits the letter-size document to be put on the document reading bed 6 such that a direction of a long side of the document corresponds to a rightward and leftward direction of the MFD 1, and the sheet-supply tray 14 is formed in a size that permits the recording sheet to be accommodated such that a direction of a long side of the recording sheet corresponds to the forward and backward direction in the MFD 1. Therefore, the above-described depth of the protruding portion 16 generally corresponds to a difference between the length of the long side of the A-4 size sheet and the length of the short side of the letter-size document. In this arrangement, a space having an oblong rectangle shape is left on an upper surface of the protruding portion 16, owing to a structure of the MFD 1 in which a widthwise dimension of the printer 2 is adjusted to a widthwise dimension of the scanner 3. As will be described later in detail, in the present MFD 1, the operation panel 4 is disposed on the above-described space provided on the upper surface of the protruding portion 16.

In the printer 2, there is provided a sheet-feed path having a U-turn form which is initially upwardly extended from a rear side of the sheet-supply tray 14, then curved horizontally from the rear side toward a front side of the MFD 1, and finally connected to the sheet-discharge tray 15. The recording sheet accommodated in the sheet-supply tray 14 is fed into the sheet-feed path such that the short side of the recording sheet is fed as a leading end. Then, the same sheet is carried through the sheet-feed path in a U-turn motion, thereby being guided to a recording position provided in a middle of the sheet-feed path. At the recording position, the image is recorded onto the recording sheet by the above-described ink-jet recording apparatus. The recording sheet on which the image has been recorded is discharged to the sheet-discharge tray 15.

Figure 2:
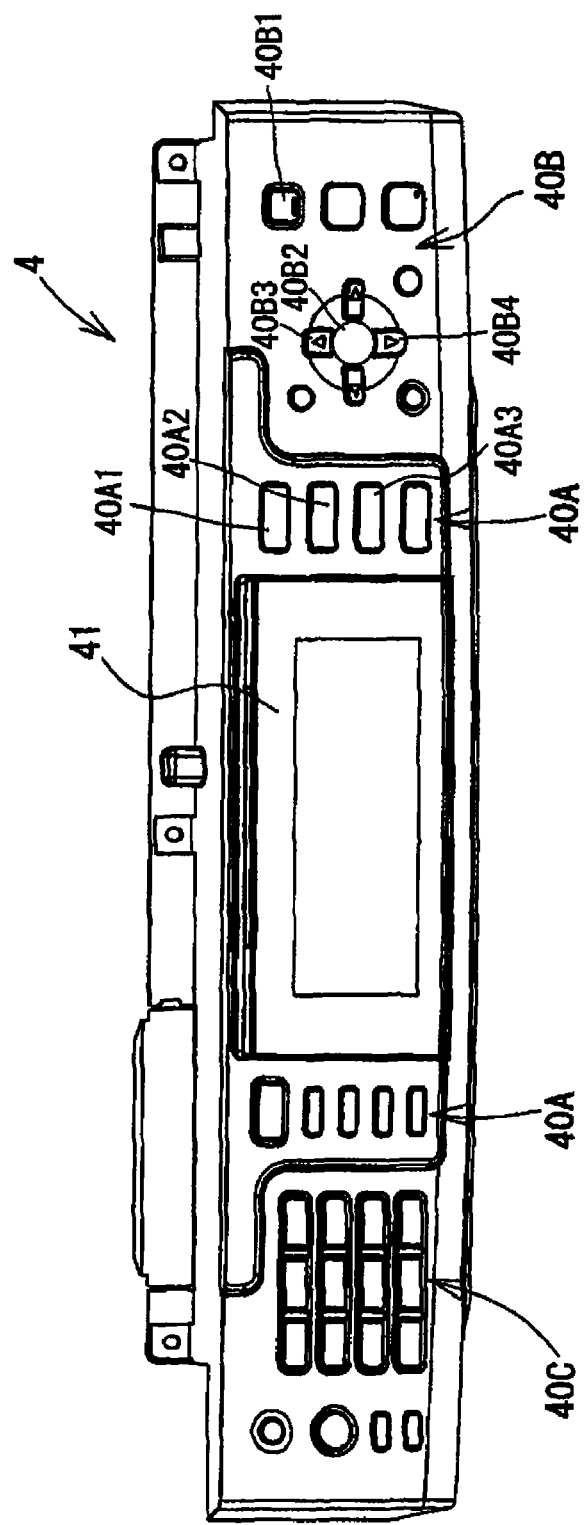
FIG. 2 is a plan view of the image reading apparatus partially showing an operation panel thereof.

The operation panel 4 is provided on the front side of the MFD 1. As shown in FIGS. 1 and 2, the operation panel 4 has the oblong, rectangular shape so as to fit in the above-described space provided on the upper surface of the protruding portion 16. In other words, the operation panel 4 is configured such that a depth dimension thereof fits in a length which corresponds to a difference between a depth dimension of the scanner 3 and a depth dimension of the printer 2, i.e., a depth dimension of the above-described space. The operation panel 4 for operating the printer 2 and the scanner 3 includes various operation keys 40 constituting an operable device and a Liquid Crystal Display (LCD) 41 functioning as a display device.

An operator can input various commands as desired by operating the operation panel 4. When predetermined commands are inputted into the MFD 1, operations of the MFD 1 are controlled by a control section 20 (shown in FIG. 3) based on information of the commands. There will be more specifically described a construction of the operation panel 4. The MFD 1 is systematically configured so as to be operated based on the information of commands transmitted, via a printer driver or a scanner driver, etc., from the above-described computer which is connected thereto, other than the information of the commands inputted from the operation panel 4.

A connecting panel 70 is provided above the opening 5 of the printer 2. In the connecting panel 70, a USB terminal 71 is provided on a left end portion thereof The USB terminal 71 functions as a connector terminal by which the MFD 1 is connected to the external device via a USB cable such that the MFD 1 can perform a data communication with the external device. Further, in the connecting panel 70, a slot section 72 is provided on a right end portion thereof. In the slot section 72, there is provided a plurality of card slots into each of which a card-type memory can be inserted. When the card-type memory is inserted into one of the plurality of card slots so that the image data is read by the control section 20 therefrom, the image based on the image data which has been read and information about the image data are displayed on the LCD 41 which is controlled by the control section 20, or, the image which is chosen by the operator is recorded on the recording sheet in the printer 2.

Next, there will be more specifically described the operation panel 4 of the MFD 1.

FIG. 2 is a plan view of the MFD 1 partially showing a construction of the operation panel 4 thereof. As shown in FIG. 2, the operation panel 4 is provided on the upper surface of the protruding portion 16, namely, on the front side of the scanner 3. The operation panel 4 includes the operation keys 40 and the LCD 41. The LCD 41 has, in the plan view, the oblong, rectangular shape in which its lengthwise dimension is almost the same as, or more specifically, slightly smaller than a lengthwise dimension of the operation panel 4. Therefore, a space for disposing the operation keys 40 is not secured on the operation panel 4 at an upper side and a lower side of the LCD 41. In other words, the LCD 41 is made in the largest size in the lengthwise dimension as far as the LCD 41 can be provided on the operation panel 4. In the MFD 1, the LCD 41 is provided at a position in which the LCD 41 can be easily visually identified by the operator in a state in which the MFD 1 is disposed so as to be operable. In the present embodiment, the LCD 41 is provided on an upper portion of the MFD 1. However, the LCD 1 is not limited to be provided on the upper portion of the MFD 1, but may be provided on, for instance, the front face of the MFD 1 as long as the LCD 41 can be visually identified by the operator when the operator operates the operation panel 4. Further, the LCD 41 is not limited to be provided integrally with the operation panel 4, but may be configured so as to be attachable to and detachable from the operation panel 4.

As shown in FIG. 2, the LCD 41 is disposed on a central portion of the operation panel 4 in its widthwise direction, i.e., the rightward and leftward direction. A widthwise dimension of the LCD 41 is sufficiently smaller than a widthwise dimension of the operation panel 4. Therefore, enough space for disposing the operation keys 40 is secured on the operation panel 4 at a right and left sides of the LCD 41. Owing to the above-described arrangement in which the LCD 41 is disposed on the central portion of the operation panel 4, the operation keys 40 can be disposed on the operation panel 4 at the right and left sides of the LCD 41. Therefore, the operation keys 40 and the LCD 41 are disposed so as to be well-balanced with respect to each other. In the MFD 1, the image data which has been read by the scanner 3 is outputted to the LCD 41, so that the operator can check a state of the reading operation.

The operation keys 40 are roughly classified into the following three groups: (a) a group of operation keys 40A disposed adjacent to the LCD 41 on the operation panel 4, (b) a group of operation keys 40B disposed on a right end portion of the operation panel 4, and (c) a group of operation keys 40C disposed on a left end portion of the operation panel 4. The group of operation keys 40A is arranged in two rows which are disposed along right and left edges of the LCD 41, respectively. Owing to the above-described arrangement, space of the right and left end portions of the operation panel 4 can be effectively utilized.

The operation keys 40A which are provided at the right side of the LCD 41 on the operation panel 4 include operation-mode selection keys 40A1, 40A2, and 40A3. The operation-mode selection keys 40A1, 40A2, 40A3 for selecting an operation-mode of the MFD 1 function as a facsimile-mode key, a copy-mode key, and a scanner-mode key, respectively. The MFD 1 is set in a facsimile mode (reception mode) in a normal state so as to be operated as the facsimile for receiving facsimile data. When a command is inputted via a selected one of the operation-mode selection keys 40A1, 40A2, 40A3, a mode of the MFD 1 is temporarily changed from the facsimile mode (the reception mode) to an operation mode which corresponds to the selected one of the operation-mode selection keys 40A1, 40A2, 40A3 (selected one of a facsimile mode, a copy mode, and a scanner mode). Then, the MFD 1 is operated in the above-described operation mode which is selected by the operator.

More specifically, the operation-mode selection key 40A1, i.e., the facsimile-mode key 40A1, is for requesting the MFD 1 to be operated in the facsimile mode (transmission mode). When the facsimile-mode key 40A1 is pressed, reading the document by the scanner 3 and transmitting the image data which has been read to a recipient facsimile are performable in the MFD 1. The operation-mode selection key 40A2, i.e., the copy-mode key 40A2, is for requesting the MFD 1 to be operated in the copy mode. When the copy-mode key 40A2 is pressed, reading the document by the scanner 3 and outputting the image data which has been read to the printer 2 are performable in the MFD 1. The operation-mode selection key 40A3, i.e., the scanner-mode key 40A3, is for requesting the MFD 1 to be operated in the scanner mode. When the scanner-mode key 40A3 is pressed, reading the document by the scanner 3 and outputting the image data which has been read to the PC are performable in the MFD 1.

Therefore, the operation-mode selection keys 40A1, 40A2, 40A3 are for assigning the MFD 1 to execute the operations including the reading operation performed by the scanner 3, namely, to perform the selected one of the printer function, the scanner function, and the facsimile function.

The operation keys 40B include the pause key 40B1, a determination key 40B2, and modification keys 40B3, 40B4. As described above, the pause key 40B1 is for inputting a pause command (a specific command) to pause the reading operation. When the pause key 40B1 is pressed by the operator, the reading operation is forcedly finished even if the reading operation has not been yet completed on the end margin of the document. Then, the document is discharged to the document-discharge tray 10 where the ADF 7 is used in the MFD 1 so that the reading operation is performable on the following document, or, the reading head is moved back to the predetermined position as the home position where the MFD 1 functions as the FBS so that the reading operation starts to be performed again on the same document. As described above, even when the pause key 40B1 is pressed down to pause the reading operation, the image data which has already been read, i.e., the image data of the image of the part of the document, is not deleted but kept and outputted to the image-data receiving device. In other words, with the pause key 40B1 being pressed, the output range of the image data is determined as a range of the image data that is read in a range of the document which ranges from a beginning margin of the document (a reading-operation starting portion) to a portion thereof that is read at a timing when the pause command (the specific command) is inputted so that the end margin of the output range of the image data is determined. Since the image based on the image data which is read by the scanner 3 is sequentially displayed on the LCD 41 according to the reading operation, the operator can determine the output range of the image data of the image of the document as desired, namely, the operator can assign the MFD 1 to read a desired part of the document and output the image data which has been read from the part of the document, by operating the pause key 40B1 while visually identifying or checking the LCD 41.

The modification keys 40B3, 40B4 are for modifying the output range of the image data. The output range of the image data which is determined by the above-described operation of the pause key 40B1 can be modified, only before the determination key 40B2 is pressed, by operating the modification keys 40B3, 40B4 within a range of the image data which has been read.

In the MFD 1, the reading operation on the document by the scanner 3 is sequentially performed, whereby the output range of the image data which is determined by the operation of the pause key 40B1 changes second by second. However, if the operator operates the pause key 40B1 at a wrong timing, the reading operation by the scanner 3 may pause at an undesired position for the operator on the document and accordingly, the output range of the image data may not be determined as desired. Therefore, in order to modify the output range of the image data which is determined by the operation of the pause key 40B1, the modification keys 40B3, 40B4 are provided in the MFD 1.

The modification key 40B3 is for reducing the output range of the image data. In the MFD 1, one line data which is read by the line image sensor in a main scanning direction is one line unit. The modification of the output range can be performed per the above-described unit (per one line data). When the modification key 40B3 is pressed one time, the end margin of the output range of the image data is moved, by one line, from a present position toward the beginning margin of the document (the reading-operation starting portion).

The modification key 40B4 is for enlarging the output range of the image data. When the modification key 40B4 is pressed one time, the end margin of the output range of the image data is moved, by one line, from a present position toward the end margin of the document. Therefore, the operator can re-modify the output range of the image data as desired by operating the modification key 40B4 when the operator desires to enlarge the output range of the image data which has already been reduced.

When the above-described modification keys 40B3, 40B4 are operated, the image displayed on the LCD 41 is updated based on the output range which has been modified. Therefore, the operator can reliably modify the output range of the image data as desired by operating the modification keys 40B3, 40B4 while visually identifying the LCD 41. It is noted that the output range of the image data cannot be enlarged beyond the range of the image data which has been read. Therefore, the output range of the image data can be enlarged at most only within the output range of the image data which has been determined by the operation of the pause key 40B1.

Figure 3:
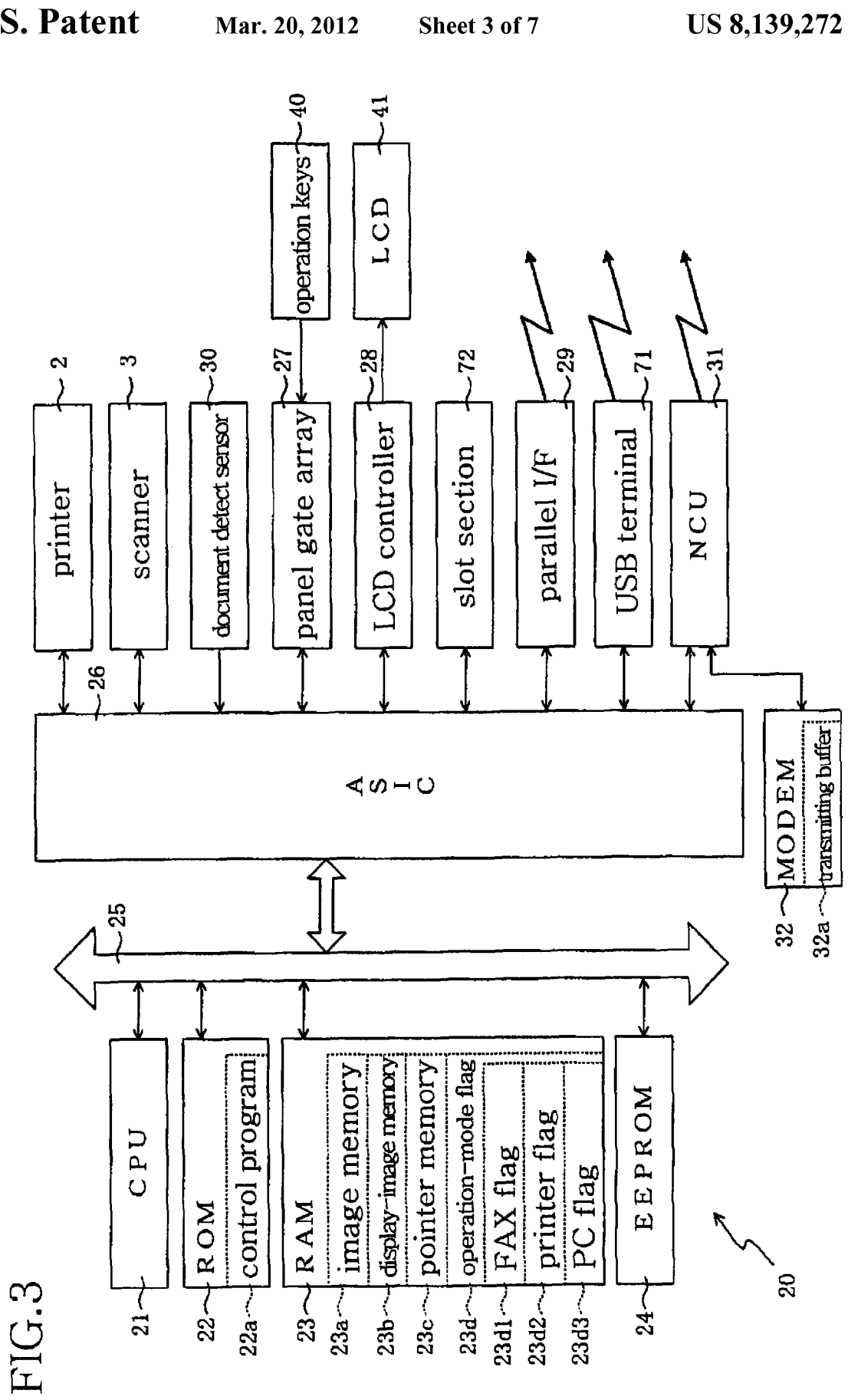
FIG. 3 is a block diagram showing an electrical construction of the image reading apparatus.
Figure 4:
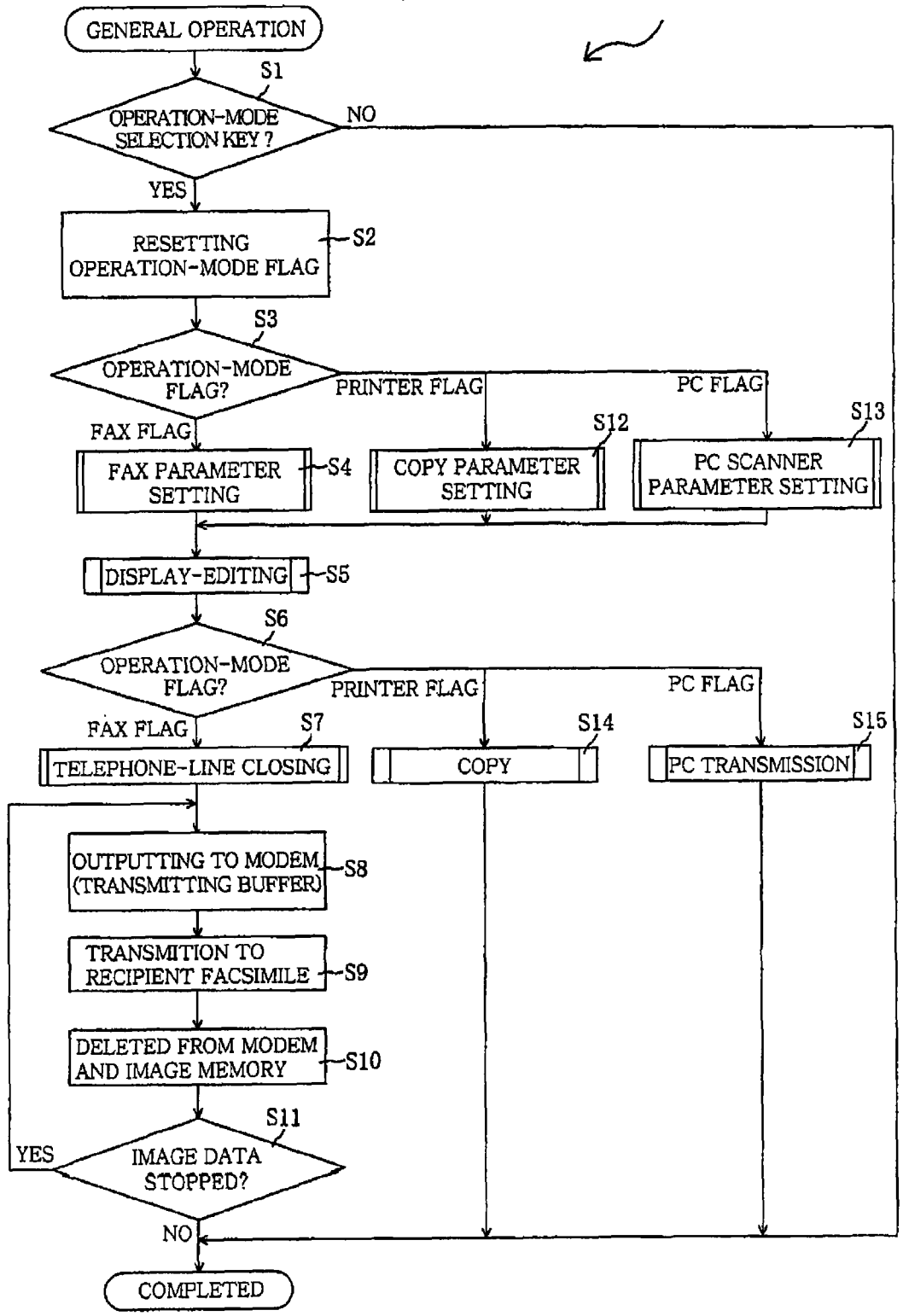
FIG. 4 is a flowchart of a general operation which is performed in the image reading apparatus.
Figure 5:
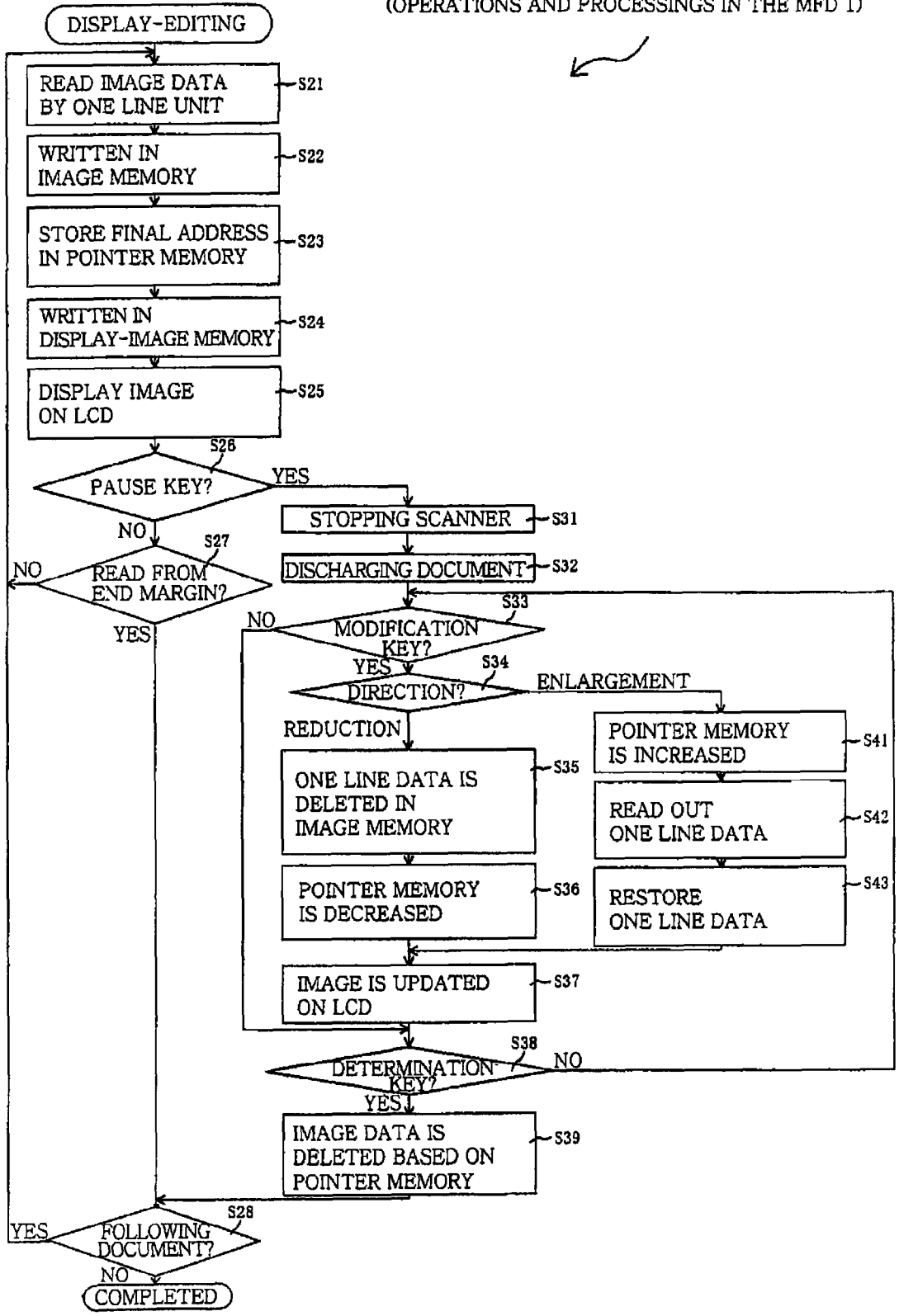
FIG. 5 is a flowchart of a display-editing operation which is performed in the general operation in FIG. 4.

Hereinafter, there will be described a schematic construction of the control section 20 which controls operations in the MFD 1 by reference to the block diagram shown in FIG. 3. FIG. 3 is the block diagram showing the electrical construction of the MFD 1. The control section 20 is for controlling the operations in the MFD 1 which includes the printer 2, the scanner 3, and the operation panel 4. As shown in FIG. 3, the control section 20 is configured as a micro computer which mainly includes a CPU (Central Processing Unit) 21 as an arithmetical unit, a ROM (Read Only Memory) 22 as a nonvolatile memory which stores various control programs and fixed value data to be processed by the CPU 21 and which is not rewritable, a RAM (Random Access Memory) 23 as a memory for temporarily storing various data, etc., and an EEPROM (Electrically Erasable and Programmable ROM) 24 as a nonvolatile memory which is rewritable. The CPU 21, the ROM 22, the RAM 23, and the EEPROM 24 are connected to one another via a bus 25. The bus 25 is connected to an ASIC (Application Specific Integrated Circuit) 26. Programs indicated in the flowcharts shown in FIGS. 4 and 5 are stored in the ROM 22 as a part of a control program 22*a*.

The CPU 21 controls various portions of the MFD 1 based on the control program 22*a* stored in the ROM 22 such that the each of a facsimile operation, a copy operation, and a scanner operation is performed in the MFD 1.

The RAM 23 includes an image memory 23*a*, a display-image memory 23*b*, a pointer memory 23*c*, and operation-mode flags 23*d*. The image memory 23*a* is for storing the image data of the image of the document which is read by the scanner 3. The image data (the one line data) of the image of the document which has been read by the line image sensor by one line is to be outputted one by one from the scanner 3. Then, the image data is stored in the image memory 23a in an order of the outputting. That is, in the present MFD 1, the one line data of the document corresponds to the image data of one section of the document. The image data of sections of the document is read by the scanner 3 one by one. The image data of the sections of the documents which has been read is stored in the image memory 23a. The image data stored in the image memory 23a is triggered to be deleted from the image memory 23a by the fact that the image data is outputted to the assigned image-data receiving device. In other words, the image data which has been read is kept in the image memory 23a until being outputted to the image-data receiving device.

The display-image memory 23b is for storing the image data which is a source for the image to be displayed on the LCD 41. The image data stored in the image memory 23a is written into the display-image memory 23b, then outputted to an LCD controller 28 from the display-image memory 23b. The image data which has been read by the scanner 3 is successively written into the image memory 23a, whereby the image data stored in the image memory 23a is successively written into the display-image memory 23b as well. Since the image is to be displayed on the LCD 41 based on the image data stored in the display-image memory 23b, the image displayed on the LCD 41 is updated as the reading operation by the scanner 3 progresses. Therefore, the image based on the image data which has been read by the scanner 3 is successively displayed on the LCD.

As described above, the image data which is the source for the image that is displayed on the LCD 41 after the output range of the image data is determined is to be modified by the operation of the modification keys 40B3, 40B4. When the output range is reduced, the image data in a data area corresponding to a range of the image data that is excluded from the output range by reducing is deleted from the display-image memory 23b. When the output range is enlarged after the output range has been reduced, the image data in the data area corresponding to the range of the image data that has been excluded from the output range is read out from the image memory 23a, and then written into the display-image memory 23b so that the range of the image data that has been excluded is included again in the output range.

The pointer memory 23c is for indicating, among the image data stored in the image memory 23a, data corresponding to the image data based on the end margin of the image to be displayed on the LCD 41. The pointer memory 23c stores a value of an address of the above-described corresponding image data in the image memory 23a. Every time the image data is stored by one line in the image memory 23a (namely, every time the one line data is stored in the image memory 23a), a value of an address of the image data which is stored in the image memory 23a last is written into the pointer memory 23c.

Therefore, when the output range of the image data is determined by operating the pause key 40B1, an address of the image memory 23a storing the image data of the end margin of the output range is stored into the pointer memory 23c. The modification of the output range of the image data is performed by one line, whereby, in one modification, the image data is to be deleted from or restored in the image memory 23a by one line, namely, by a predetermined number of bit-map data. In other words, in one modification, the end margin of the output range is moved by "n" address (the predetermined number "n") in which the predetermined number of bit-map data is stored. When the modification key 40B3 or the modification key 40B4 is operated, the predetermined number "n" is added to or deducted from, by the CPU 21, the value of the address which is to be stored in the pointer memory 23c, based on which one of the modification keys 40B3, 40B4 is operated. Owing to the value of the address stored in the pointer memory 23c, there is indicated a point (address) of the image memory 23a to which the image data as the source of the image currently displayed on the LCD 41 is stored, namely, a point (address) of the image memory 23a to which the image data to be stored in the display-image memory 23b is stored. As a result, when the image data is deleted from the display-image memory 23b according to the modification of the output range, it is possible to identify the data area in which the image data has been deleted. Further, it is possible to restore the output range by reading out, from the image memory 23a, the image data in a data area corresponding to the data area in which the image data has been deleted.

The operation-mode flags 23d are for indicating the operation mode of the MFD 1, namely, for indicating the image-data receiving device to which the image data that has been read by the scanner 3 is to be outputted. The operation-mode flags 23d include a FAX flag 23d1, a printer flag 23d2, and a PC flag 23d3.

The MFD 1 has various functions, i.e., the facsimile function, the copy function, the scanner function, and the printer function. The reading operation on the image data by the scanner 3 is a common operation for the facsimile function (the transmission mode), the copy function, and the scanner function. Therefore, the MFD 1 can not perform the operation according to any one of the three functions after the reading operation unless which one of the three functions should be performed is indicated.

Therefore, in the MFD 1, there are provided the FAX flag 23d1, the printer flag 23d2, and the PC flag 23d3 for indicating the facsimile function (the transmission mode), the copy function, and the scanner function, respectively, which should be performed after the reading operation.

Each of the FAX flag 23d1, the printer flag 23d2, and the PC flag 23d3 is to be turned "ON" or "OFF" based on a predetermined command inputted by the operator. More specifically, when the facsimile-mode key 40A1 is pressed in the operation panel 4, the FAX flag 23d1 is turned "ON" based on a judgment that the operator wants to transmit the image data by the MFD 1 as a facsimile. In the meantime, the printer flag 23d2 and the PC flag 23d3 are turned "OFF" in this case. Owing to the FAX flag 23d1 being turned "ON", it is indicated that the operation mode set for the MFD 1 is the facsimile mode while the image-data receiving device is a facsimile, in this case.

In the same manner as the above-described facsimile-mode key 40A1, when the copy-mode key 40A2 is pressed in the operation panel 4, the printer flag 23d2 is turned "ON" while the FAX flag 23d1 and the PC flag 23d3 are turned "OFF". Owing to the printer flag 23d2 being turned "ON", it is indicated that the operation mode set for the MFD 1 is the copy mode while the image-data receiving device is the printer 2. Also, when the scanner-mode key 40A3 is pressed in the operation panel 4, the PC flag 23d3 is turned "ON" while the FAX flag 23d1 and the printer flag 23d2 are turned "OFF". Owing to the PC flag 23d3 being turned "ON", it is indicated that the operation mode set for the MFD 1 is the scanner mode while the image-data receiving device is the PC.

The above-described operation-mode flags 23d are referred to by the CPU 21 in the later-described general operation (as shown in FIG. 4). The function which is indicated by a selected one of the operation-mode flags 23d is exhibited in the MFD 1.

In a normal state, the MFD 1 is set in the facsimile mode (the reception mode) for performing the facsimile reception. Further, in a state in which the MFD 1 is set in the facsimile mode (the reception mode for receiving the image data), a mode of the MFD 1 is temporarily changed from the facsimile mode to a printer mode in which the MFD 1 functions as the printer when receiving the image data which is transmitted or inputted from a parallel interface (a parallel I/F) 29, the USB terminal 71, and the slot section 72.

In accordance with the commands from the CPU 21, the ASIC 26 controls operations of the printer 2, the scanner 3, the operation panel 4, and the slot section 72. Further, in the reading operation performed in the scanner 3, the ASIC 26 controls the driving system to be turned "ON" and "OFF", based on a result of the detection by the document detect sensor 30. In the printer 2, the scanner 3, and the slot section 72, operations of a motor for driving the printer 2 and an ink-jet recording head, a motor for driving the ADF 7 of the scanner 3 and the image-reading unit, and so on are controlled by the control section 20. It is noted that a detail of the above-described arrangement in the printer 2, the scanner 3, and the slot section 72 will be omitted in this description. The parallel I/F 29 and the USB terminal 71 for transmitting/receiving the data to/from the computer via a parallel cable and the USB cable, respectively, are connected to the ASIC 26. Further, a NCU (Network Control Unit) 31 and a modem 32 for realizing the facsimile function are connected to the ASIC 26. The modem 32 is provided for transmitting the information of the image and a communication data while modulating and demodulating as well as for transmitting and receiving various processing signals for transmission control. Further, the modem 32 includes a transmitting buffer 32a for temporarily storing data to be transmitted. The image data which is to be transmitted in a facsimile transmission is written into the transmitting buffer 32a from the image memory 23a by one line, temporarily stored in the transmitting buffer 32a, and then transmitted to the recipient facsimile (the image-data receiving device) via a telephone line.

Further, a panel gate array 27 for controlling the operation keys 40 from which the commands are inputted into the MFD 1 is connected to the ASIC 26. The panel gate array 27 is for detecting a state in which any of the operation keys 40 is pressed, and for outputting a predetermined key code signal based on a result of the detection. Each key code signal is assigned to a corresponding one of the plurality of the operation keys 40. When the predetermined key code signal which is outputted from the panel gate array 27 is received by the CPU 21, a predetermined controlling operation is performed by following a predetermined key transaction table. The key transaction table is a table in which a key transaction is tabled such that one of the key code signals is correlated to a corresponding one of the controlling operations. The key transaction table is, for example, stored in the ROM 22.

Further, the LCD controller 28 for controlling a display of the image on the LCD 41 is connected to the ASIC 26. The LCD controller 28 controls the LCD 41 to display information of operations of the printer 2 or the scanner 3 and the image which is read by the scanner 3 or inputted to the MFD 1, based on the command of the CPU 21. The image data which is the source for the image to be displayed on the LCD 41 is outputted by the CPU 21 to the LCD controller 28. The LCD controller 28 is for storing the image data, which has been outputted, into a memory which is provided therein, as well as for generating RGB signals of each of pixels of the LCD 41 to be outputted to the LCD 41, based on the image data (a bit-map data) which is stored in the above-described memory by scanning the above-described memory at a predetermined cycle. Therefore, information stored in the above-described memory is updated when a new image data is received, and the updated information is reflected to the image displayed on the LCD 41. That is, the image which has been already displayed is not changed, whereby, as the reading operation progresses in the scanner 3, a new section of the image based on the image data which is read from a section of the document appears so as to be successively displayed on the LCD 41 in connection with the reading operation by the scanner 3.

The LCD 41 includes matrix switches (not shown) each of which corresponds to one of three RGB primary colors. By adding charge to one of the matrix switches, liquid crystal molecules belonging to the matrix switch is arranged in a direction in which light passes therethrough, whereby any one of the RGB colors is to be displayed on the LCD 41. Each one of the matrix switches corresponds to a dot of RGB (one sub-dot of RGB). Each of RGB signals which are generated by the LCD controller 28 corresponds to one of the three RGB primary colors. The charge is added to each of the matrix switches based on the RGB signals generated by the LCD controller 28, whereby an image is displayed on the LCD 41 based on the information which is generated by the CPU 21 (which includes the image data that has been read by the scanner 3).

The image based on the image data which is read is displayed on the LCD 41 when the reading operation is started in the scanner 3. In this state, owing to the command of the CPU 21, the image data is outputted from the display-image memory 23b to the LCD controller 28 such that the image based on the image data is displayed on the LCD 41 in synchronism with the reading operation performed by the scanner 3. More concretely, during the reading operation performed by the scanner 3, the image data stored in the display-image memory 23b is outputted to the LCD controller 28 whenever new image data as one-line data is stored in the LCD controller 28. In the LCD controller 28, the information stored in the above-described memory provided therein is updated whenever the new image data which is outputted from the display-image memory 23b is received, whereby the image based on the image data which has been read is successively displayed on the LCD 41 (by a predetermined range, e.g., by a range corresponding to one line data in the present embodiment.)

Next, there will be described operations and processings to be performed in the MFD 1 which is configured as described above, by referring to the flowcharts as shown in FIGS. 4 and 5, and the schematic view showing the memory operation as shown in FIG. 6. It is noted that operations and processings to be performed in the MFD 1 using the ADF 7 will be described.

FIG. 4 is the flowchart of the general operation which is performed in the MFD 1. The general operation includes: the reading operation for reading the image date from the document by the scanner 3; and the outputting operation for outputting the image data which has been read by the scanner 3 to the image-data receiving device.

The general operation is performed in the following steps in the MFD 1. Initially, it is confirmed whether a command is inputted by pressing any one of the operation-mode selection keys 40A1-40A3 (S1). When the command is not inputted through any one of the operation-mode selection keys 40A1-40A3 (S1: No), the general operation is finished because the MFD 1 is not requested to perform any of the three functions, i.e., the facsimile function, the copy function, and the scanner function. When the command is inputted by pressing any one of the operation-mode selection keys 40A1-40A3 (S1: Yes), a condition of the operation-mode flags 23d is updated based on information of the command inputted by pressing the selected one of the operation-mode selection keys 40A1-40A3 because the MFD 1 is requested to perform any one of the facsimile function, the copy function, and the scanner function (S2).

More specifically, where the selected one of the operation-mode selection keys 40A1-40A3 which is pressed to input the command is the facsimile-mode key 40A1, the FAX flag 23d1 is turned "ON" to indicate that the image-data receiving device to which the image that has been read by the scanner 3 is to be outputted is the recipient facsimile while the MFD 1 is set to be operated in the facsimile mode (transmission mode). Where the selected one of the operation-mode selection keys 40A1-40A3 is the copy-mode key 40A2, the printer flag 23d2 is turned "ON" to indicate that the image-data receiving device is the printer 2 while the MFD 1 is set to be operated in the copy mode. When the selected one of the operation-mode selection keys 40A1-40A3 is the scanner-mode key 40A3, the PC flag 23d3 is turned "ON" to indicate that the image-data receiving device is the PC while the MFD 1 is set to be operated in the scanner mode. It is noted that two of the operation-mode flags 23d other than the one which corresponds to the selected one of the operation-mode selection keys 40A1-40A3 are turned "OFF" in the processing "S2".

After the processing "S2", it is confirmed which one of the operation-mode flags 23d is turned "ON" (S3). When the confirmed one of the operation-mode flags 23d is the FAX flag 23d1 (S3: the FAX flag), a FAX parameter setting processing in which various parameters are set for performing a facsimile operation (an operation of the facsimile transmission) is performed (S4). Examples of the parameters which are set in the FAX parameter setting processing include a phone number of the recipient facsimile and resolution of the image.

Subsequently, a display-editing operation for determining the output range based on the image which is displayed on the LCD 41 is performed with respect to the image data to be read (S5). After the display-editing operation "S5" is performed, the above-described confirmed one of the operation-mode flags 23d is checked (S6). When the confirmed one of the operation-mode flags 23d is the FAX flag 23d1 (S6: the FAX flag), a line-closing operation in which the telephone line is closed for performing the facsimile transmission (the transmission of the image data) is performed (S7). Then, the image data of one line which is stored in the image memory 23a is outputted to the modem 32 per one line (S8). The image data of the one line which has been outputted from the image memory 23a is written in the transmitting buffer 32a provided in the modem 32.

After the above-described processing "S8", the image data written in the transmitting buffer 32a is transmitted to the recipient facsimile via the telephone line (the facsimile transmission) (S9). Then, the image data of one line which has been already outputted is deleted from the modem 32 and the image memory 23a (S10). Further, it is confirmed whether there is any image data stored in the image memory 23a (S11). When there is no image data stored in the image memory 23a (S11: No), the general operation is finished. On the other hand, when it is confirmed that the image data is stored in the image memory 23a as a result of the processing "S11" (S11: Yes), the processings "S8"-"S11" are repeated until it is confirmed that there is no image data to be stored in the image memory 23a.

When the one of the operation-mode flags 23d is confirmed to be the printer flag 23d2 as a result of the confirmation in the processing "S3" (S3: the printer flag), a copy parameter setting processing in which various parameters are set for performing a copy operation is performed because the requested operation is copying (S12). Then, the display-editing operation is performed (S5).

When the one of the operation-mode flags 23d is confirmed to be the PC flag 23d3 as a result of the confirmation in the processing "S3" (S3: the PC flag), a PC scanner parameter setting processing in which various parameters are set for performing a scanner action is performed because the requested action is scanning in which the image data that has been read is outputted to the PC (S13). Then, the display-editing operation is performed (S5).

When the one of the operation-mode flags 23d is confirmed to be the printer flag 23d2 as a result of the confirmation in the processing "S6" (S6: the printer flag), there is performed a copy operation in which the image data that has been read is outputted to the printer 2 for recording the image (S14). Then, the general operation is completed.

When the one of the operation-mode flags 23d is confirmed to be the PC flag 23d3 as a result of the confirmation in the processing "S6" (S6: the PC flag), there is performed a PC transmission operation in which the image data that has been read is outputted to the PC that is connected to the MFD 1 via the parallel I/F 29 or the USB terminal 71 (S15). Then, the general operation is completed.

FIG. 5 is the flowchart of the display-editing operation "S5" which is performed in the general operation which is shown in FIG. 4. The display-editing operation "S5" is for reading the image data from the document as well as for determining, based on the image displayed on the LCD 41, the output range which is a range of output image data to be outputted. More specifically, the output range as the range of the output image data to be outputted is determined in the image data supposed to be read with respect to an entire image of the document, based on the areas whose images are displayed on the LCD 41 at a timing when the pause command (the specific command) is detected.

Figure 6A:
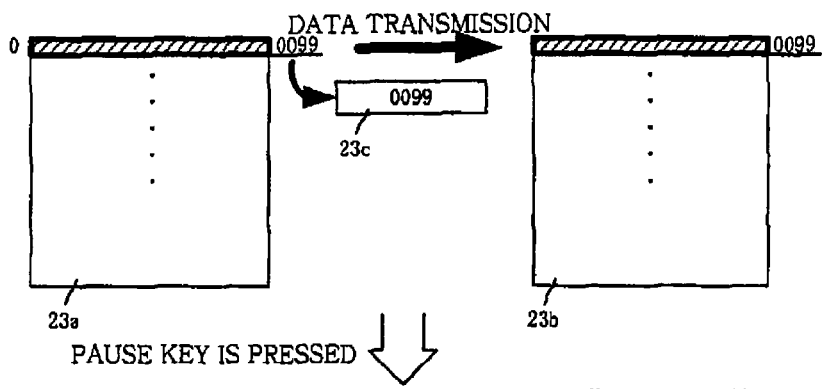
FIGS. 6A-6E are schematic views each showing memory operations of an image memory and a display-image memory.

The display-editing operation "S5" is performed in the following steps. Initially, the scanner 3 is driven to read the image data from the document by one line (S21). The processing "S21" constitutes a part of the reading operation. After the image data which has been read by the scanner 3, i.e., one line data, is written in the image memory 23a (S22), a final address (a value of the final address) at which a final image data is stored in the image memory 23a is stored in the pointer memory 23c, as shown in FIG. 6A (S23). In FIGS. 6A-6E, the image memory 23a is schematically shown on the left-hand side thereof, the display-image memory 23b is schematically shown on the right-hand side thereof, and the pointer memory 23c is schematically shown between the image memory 23a and the display-image memory 23b.

Subsequently, the image data (one line data) which is newly stored in the image memory 23a is written into the display-image memory 23b, as shown in FIG. 6A (S24). The image based on the image data stored in the display-image memory 23b is displayed on the LCD 41, namely, the image data stored in the display-image memory 23b is outputted to the LCD controller 28 (S25). Since an operation of reading the image data for one line by the scanner 3 is performed in connection with an operation of displaying, on the LCD 41, the image based on the image data which has been read by the scanner 3 such that the image is displayed on the LCD 41 immediately after the image data is read, the operation of reading the image data and the operation of displaying the image based on the image data which has been read are synchronically performed with each other. It is noted that, in the present MFD 1, the image data is outputted from the display-image memory 23b to the LCD controller 28 in one line. However, the image data may be outputted from the display-image memory 23b to the LCD controller 28 in a predetermined unit other than one line, for instance, in a plurality of image lines.

Then, it is confirmed whether the pause key 40B1 is pressed or not (S26). Where the pause key 40B1 is not pressed (S26: No), it is confirmed whether the reading operation on the document by the scanner 3 is finished on the end margin of the document since the reading operation is not requested to pause (S27). Where the reading operation is confirmed to be finished on the end margin of the document (S27: Yes), the reading operation is completed. In this case, it is judged whether there are any following documents based on a result of detection by the document detect sensor 30 (S28). Where there are no following documents (S28: No), the display-editing operation "S5" is completed since the whole reading operation is finished. After the display-editing operation "S5" is completed, the image data is outputted to the image-data receiving device in the general operation. In other words, when the document which has been just read is judged to be the final document (no following documents), the outputting operation in which the image data is outputted to the image-data receiving device is performed. Therefore, the operator is not required to perform any operations for inputting a command to output the image data. Moreover, since the processing "S28" for judging presence/absence of the following documents is executed after processings for determining and modifying the output range, the output image data is outputted after the output range is determined as desired. Therefore, the output image data is outputted at an accurate timing.

On the other hand, where it is confirmed that the reading operation is not finished on the end margin of the document (S27: No), the processings "S21"-"S27" are repeated until it is confirmed that the command to stop the general operation is inputted by pressing the pause key 40B1, or, until the reading operation on the document by the scanner 3 is finished on the end margin of the document. Also, where there are the following documents (S28: Yes), the processing "S21" is executed on the following document in order to perform the reading operation on the same document since the reading operation has not been completed on all documents.

Further, where it is confirmed that the pause key 40B1 is pressed based on a result of the confirmation in the processing "S26" (S26: Yes), the scanner 3 is stopped since the command for stopping the reading operation on the document is inputted even before it is completed (S31). The document on which the reading operation is not completed is discharged to the document-discharge tray 10 (S32). As described above, the processings "S31" and "S32" are executed at a timing when the pause key 40B1 is pressed, whereby a range of the document that ranges from the beginning margin thereof to a part thereof which is read at a timing when the pause key 40B1 is pressed is referred to as a reading range of the document, i.e., the output range of the image data which can be outputted to the image-data receiving device. In other words, a range in the document whose image data is outputted is determined by pressing the pause key 40B1 (a determination of the output range of the image data).

In a general image reading apparatus, the image data which has been read is deleted when the reading operation on the document is stopped before the reading operation is performed on the end margin of the document because an operation of stopping the reading operation is recognized as a cancellation of the general operation. Therefore, when the reading operation is stopped, it is impossible to output the image data which has been read before the operation of stopping. However, in the MFD 1 in the present embodiment, the image data is not deleted and kept even when the reading operation pauses. Therefore, it is possible to perform the outputting operation on the image data which is partially read from the document.

According to the above-described arrangement of the MFD 1 in the present embodiment, it is possible to avoid a situation in which the image data that is highly needed is outputted as being intermingled with the image data that is less needed because a needed range of the image data in a whole image data of the document is selected and outputted to the image-data receiving device. Further, it is possible to save the recording sheet and so on when the image based on the output image data is recorded thereon.

Figure 6B:
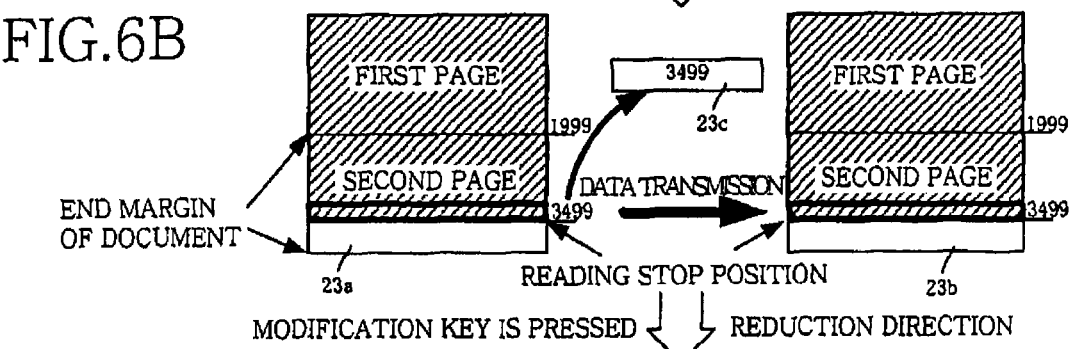

In FIG. 6B, there is illustrated a state in which the pause key 40B1 is pressed in the middle of the reading operation on the following document as a second page document. In this state, not a whole image data, but the image data of a range from the beginning margin to a middle portion of the second page document is stored in the image memory 23a. It is noted that, in order to simplify the description, the one line data (the image data per one line) is to be stored in an area of 100 addresses, and the whole image data is to be stored in an area of 2000 addresses. Therefore, when the whole image data is read, the image data of the image of a first page document is stored in the image memory 23a at the addresses from "0" to "1999" and the image data of the image of the second page document is stored at the addresses from "2000" to "3999". As shown in FIG. 6B, the image data of the image of the second page document is stored at the addresses from "2000" to "3499" since the reading operation pauses as a result of pressing the pause key 40B1 before the reading operation is completed on the second page document. Further, the image data (of the image of the first page document and the second page document) is also stored in the display-image memory 23b at the addresses from "0" to "3499" since the image data stored in the image memory 23a is immediately transferred to the display-image memory 23b.

Figure 6C:
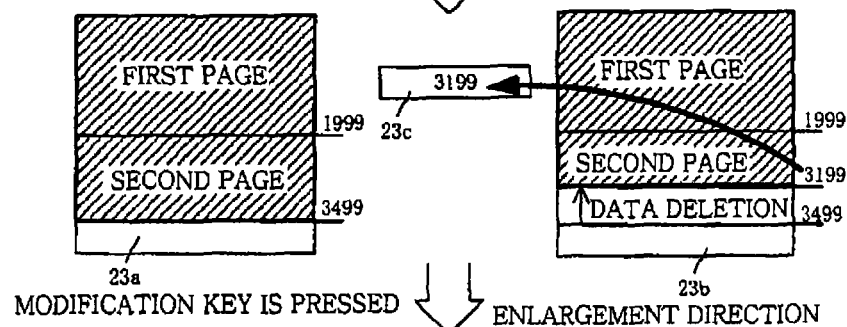

After the processing "S32" is performed, it is confirmed whether any one of the modification keys 40B3, 40B4 is pressed (S33). Where any one of the modification keys 40B3, 40B4 is pressed (S33: Yes), the modification of the output range of the image data which is determined by pressing the pause key 40B1 is requested. Therefore, it is confirmed whether the output range of the image data needs to be modified in a direction in which the output range of the image data is reduced (a reduction direction) by pressing the modification key 40B3 or in a direction in which the output range of the image data is enlarged (an enlargement direction) by pressing the modification key 40B4 (S34). Where the image data needs to be modified in the reduction direction (S34), the image data corresponding to one line of the document (one line data) is deleted in a direction from the final address to the address "0" in the image memory 23a where the image data is stored (S35). FIG. 6C illustrates a state in which the output range of the image data is reduced by a data amount corresponding to three lines (three line data) as a result of pressing the modification key 40B3. In FIG. 6C, the three line image data is deleted from the image memory 23a by pressing the modification key 40B3 three times. In this state, the image data is stored in an area of the image memory 23a at the addresses from "0" to "3199".

Then, a value of the pointer memory 23c is updated by subtracting a predetermined number "n" (an "n" address for storing the one line data) from the value of the address stored in the pointer memory 23c, as shown in FIG. 6C (S36).

Figure 6D:
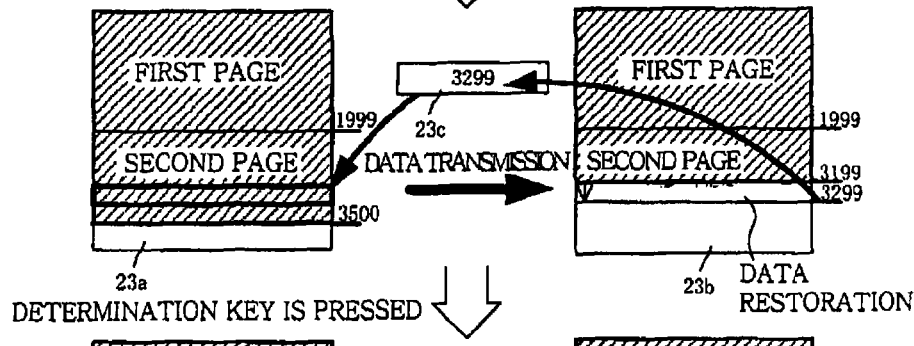

On the other hand, where the image data needs to be modified in the enlargement direction (S34), the predetermined number "n" is added to the value of the address stored in the pointer memory 23c (S41). To press the modification key 40B4 is to request the modification of the output range of the image data in which the one line data is added to the current output range of the image data. In FIG. 6D, in a state in which the final address of the image data to be stored in the display-image memory 23b is "3199", namely, in a state in which the value of "3199" is stored in the pointer memory 23c, the image data stored in an area up to the address "3299" is requested to be determined as the output range by pressing the modification key 40B4 one time. Therefore, the value of "3199" stored in the pointer memory 23c is updated to the value of "3299" by adding "100" as the predetermined number "n" thereto.

Following the above-described processings, the image data corresponding to one line is read out from the image memory 23a (the one line data) based on the address (i.e., the value of the address) stored in the pointer memory 23c (S42). The one line data which has been read out is restored in a vacant area of the display-image memory 23b, sequentially from an address with a minimum number (S43). For example, as shown in FIG. 6D, when the address to be stored in the pointer memory 23c is "3299", the one line data stored at the addresses from "3299" to a value which is "100" less than "3299" by "100", namely, the one line data at the addresses from "3200" to "3299" are read out from the image memory 23a and restored in the display-image memory 23b at the addresses from "3200" to "3299". That is, the output range of the image data can be enlarged again even after it has been reduced once. In a case in which the output range of the image data is requested to exceed a range of the image data stored in the image memory 23a, for example, in a case where the modification key 40B4 is pressed even though the image data is fully stored in the display-image memory 23b at the addresses from "0" to "3499" as shown in FIG. 6C, the image data is not read out in the processing "S42" and is not restored in the display-image memory 23b in the processing "S43" since there is no image data which can be outputted from the image memory 23a. In this case, the processing "S37" is subsequently executed.

In the display-editing operation "S5", the output range of the image data is determined before the whole image data of the document is read out and displayed, owing to the operation in which the pause key 40B1 is pressed. By performing a sequential operation, the output range of the image data is finalized. Therefore, as compared with a case in which the output range of the image data is finalized after the whole image is displayed, it is possible to effectively perform an operation for reading the image data of the document to finalize the output range of the image data in a short time in the above-described arrangement.

After the processing "S36" or "S43", the processing "S37" is executed so that the display of the LCD 41 is updated by outputting the image data stored in the display-image memory 23b to the LCD controller 28 (S37). Owing to the processing "S37", the image displayed on the LCD 41 is updated according to the image data updated in the display-image memory 23b, whereby the operator can visually confirm a fact that the output range of the image data has been modified.

Figure 6E:
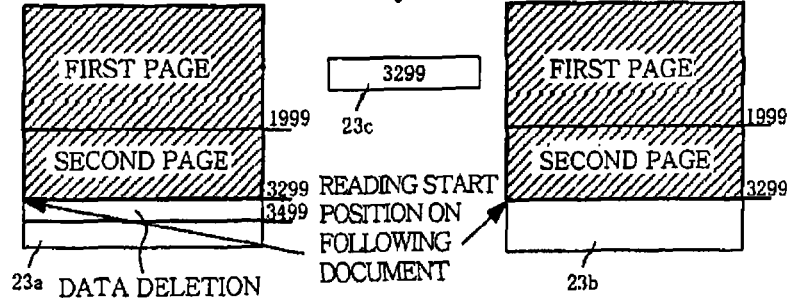

Then, it is confirmed whether or not the determination key 40B2 is pressed (S38). Where the determination key 40B2 is pressed (S38: Yes), the image data stored in an area of the image memory 23a having addresses whose values are larger than the value of the address stored in the pointer memory 23c is deleted (S39). Since the output range of the image data is finalized when the determination key 40B2 is pressed, the image data stored in the area of the image memory 23a (i.e., the image data based on which the image is not currently displayed on the LCD 41) becomes needles image data (out of the output range). For example, as shown in FIG. 6E, image data which are stored at the addresses from "3300" to "3499" are deleted since the image data becomes needles data in a case in which the output range of the image data is determined to include the image data (a group of the one line data) at the addresses "0" to "3299".

When the modification keys 40B3, 40B4 are not pressed but the determination key 40B2 is pressed, the output range of the image data which is determined by the pause key 40B1 is finalized without being modified. In other words, the image in which the range is determined by the pause key 40B1 is outputted to the image-data receiving device.

After the processing "S39", the processing "S28" is executed. Where it is confirmed that there are no following documents in the processing "28", the display-editing operation "S5" is finished. Meanwhile, when it is confirmed that the modification keys 40B3, 40B4 are not pressed as a result of the confirmation in the processing "S33" (S33: No), the processing "S38" is executed. Also, when it is confirmed that the determination key 40B2 is not pressed as a result of the confirmation in the processing "S38" (S38; No), the processing "S33" is executed to wait for inputting of the commands to be inputted from the modification keys 40B3, 40B4 or the determination key 40B2. That is, when the reading operation pauses in the middle of reading the document by pressing the pause key 40B1, the output range of the image data is not finalized until the determination key 40B2 is pressed even though the output range of the image data is determined by pressing the pause key 40B1. In this state, the output range of the image data which is determined can be modified by operating the modification keys 40B3, 40B4 until the determination key 40B2 is pressed. If the determination of the output range of the image data by pressing the pause key 40B1 is only way to determine the output range of the image data, a convenience of the operation of the MFD 1 is getting worse since an exact operation to timely operate operable elements is required for determining the output range of the image data as desired. That is, in the MFD 1, the determination of the output range of the image data by pressing the pause key 40B1 is provisional, and the output range of the image data determined by pressing the pause key 40B1 can be modifiable.

In the present embodiment, when there are any following documents in the case in which the reading operation pauses as a result of pressing the pause key 40B1, the image data which is read from an end margin of the following document is stored so as to be continuous with an end margin of the image data of the previous document in both of the image memory 23a and the display-image memory 23b. A total amount of the image data is less in the case in which the reading operation pauses in the middle of reading the document than a case in which the reading operation is completed on the end margin of the document. As shown in FIG. 6E, the image data of the second page document is stored up to the address "3999" in the case in which the reading operation is completed on the end margin of the document. However, the image data is actually stored up to the address "3299" since the output range of the image data is reduced after the reading operation pauses in the middle of reading the document. In this case, the image data of the following document (as the third page document) is to be stored in an area whose a beginning address is "3300", not "4000", in the present embodiment.

Also in this case, a part of the second page document on which the reading operation is not performed (i.e., a part of the second page document which is not determined as the output range) may be set as a blank. Data of the blank part (blank data) may be stored in a rest area (at the addresses from "3300" to "3999", as seen in FIG. 6E) which is secured in the image memory 23a and the display-image memory 23b for the second page document. In other words, the total data to be stored in the memories 23a and 23b may have a data formation (combination) of the image data and the blank data. However, in the display-editing operation "S5" in the present embodiment, there is not executed a processing for storing the blank data of a rest part of the document on which the reading operation is not performed. In the processing "S23", the image data of the following document is to be stored so as to be continuous with an end margin of the image data of the document which has been already stored. Therefore, the image memory 23a and the display-image memory 23b can be effectively utilized.

In this arrangement, the image based on the image data of the document is sequentially displayed with the image based on the image data which has been read from the previous document (i.e., the output range) since the image to be displayed on the LCD 41 is based on the image data stored in the display-image memory 23b. That is, the image of the following document is displayed on the LCD 41 in a vicinity of the image displayed thereon with respect to the document on which the reading operation has been performed when the reading operation is performed on the following document. Therefore, a wasteful blank image (i.e., an image of the part of the document from which no image data is read) is not displayed on the LCD 41, whereby the operator can sequentially visually identify the image of a plurality of documents which need to be confirmed and can easily confirm the image of the plurality of documents when the operator confirms a state of the reading operation thereon.

Figure 7A:
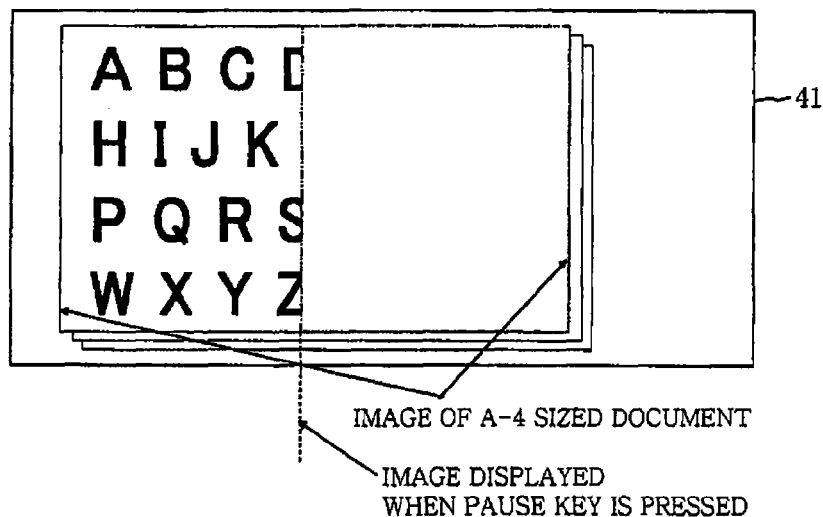
FIGS. 7A-7C are views each showing an example of the image when a reading operation of image data is performed.
Figure 7B:
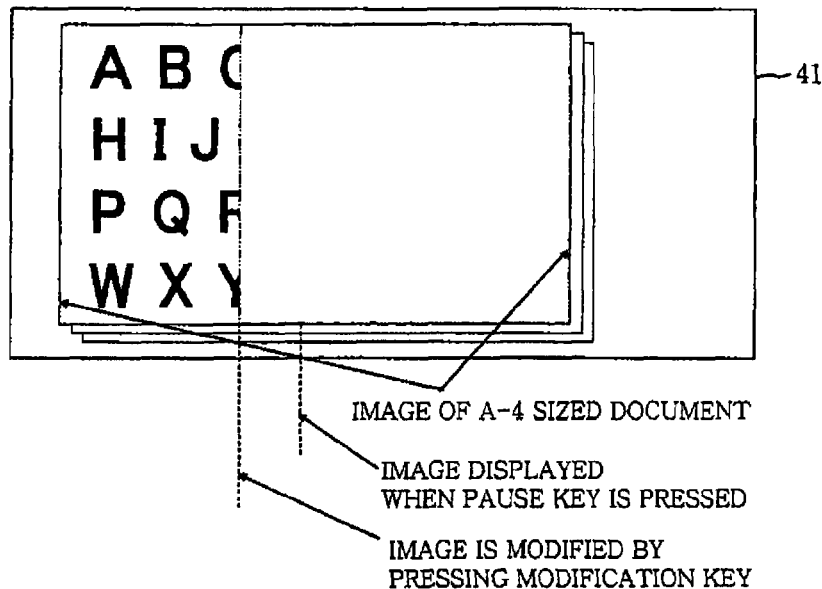
Figure 7C:
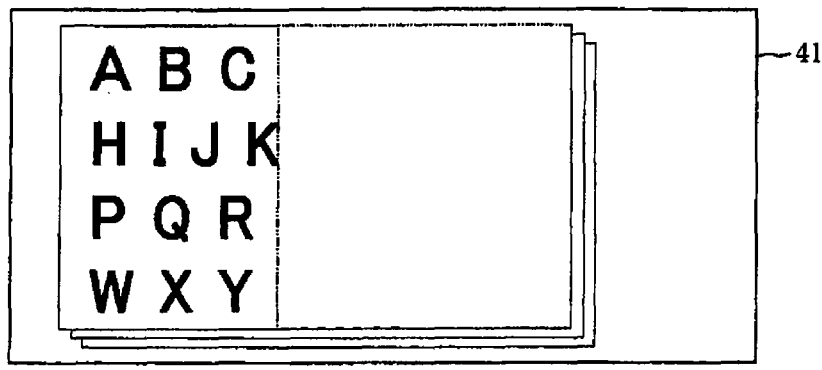

FIGS. 7A-7C are views each showing an example of the display screen when reading of the image data is performed. In FIGS. 7A-7C, there is illustrated a case in which the reading operation is performed on the A-4 size document.

On the display screen of the LCD 41, a frame which is defined by a size of the document to be read is displayed. As the example shown in FIGS. 7A-7C, the frame corresponds to the A-4 size document. The image data is to be displayed in the frame one line by one line, in synchronism with the reading operation by the scanner 3.

In FIGS. 7A-7C, a short side of the LCD 41 corresponds to a width of the document (as measured in the forward and backward direction of the MFD 1), and a long side of the LCD 41 extends in a direction in which the document is fed. A left end of the frame displayed on the display screen of the LCD 41 corresponds to an upper end as the leading end (i.e., a reading-start end) of the document. The image based on the image data which is read in the rightward direction is sequentially displayed in the frame in order. Further, the image of a document whose image data is newly read is displayed in the front-most frame, and the image of a document whose image data has been previously read is displayed in a frame behind the above-indicated front-most frame so as to overlap the same.

As shown in FIGS. 7A-7C, alphabet characters "A, B, C, D . . . " are recorded on the document which is to be read. As shown in FIGS. 7A-7C, in the front-most frame of the LCD 41, the image of the alphabet characters "A, B, C, D . . . " on the document appears up to a position thereof in which the image data is currently read. In the present embodiment, a range of the image data based on which the image appears on the LCD 41 (including the image data based on which the image appears in the frame behind the front-most frame) is set as the output range of the image data to be outputted to the image-data receiving device. In the image-data receiving device, the images which are displayed in one frame are recorded on one sheet.

It is noted that a manner of displaying the image on the LCD 41 is not limited to the above-described manner. For example, the image based on the image data of total pages of the documents may be displayed in a scrolling manner. Further, the images based on the image data of a plurality of pages of the documents may be displayed at once in the display screen (a multi-display manner). In the multi-display manner, when one image is selected from the images based on the image data of the plurality of pages of the documents, the selected one image may be enlarged in the display screen. As described above, various manners of displaying the image can be properly adopted. Also, the LCD 41 may be configured such that a plurality of manners of displaying the image or the images can be switched according to the operator's selection.

In FIG. 7A, there is illustrated a case in which the reading operation pauses in the middle of reading the document by pressing the pause key 40B1. More specifically, in the front-most frame displayed on the LCD 41 shown in FIG. 7A, the image of the alphabet characters "A, B, C, D . . . " are displayed in a range from a left end of the frame to a middle portion thereof corresponding to the position of the document in which the reading operation on the document pauses. On the other hand, the image does not appear in a range from the middle portion of the frame to a right end of the frame i.e., in a range which is surrounded by a chain double-dashed line, since there is no images whose image data has been read.

As described above, the image based on the image data which has been read is displayed on the LCD 41 in synchronism with the reading operation by the scanner 3. Therefore, the operator can recognize a part of the document on which the reading operation is performed by visually identifying the image which is displayed on the LCD 41. At the timing when the reading operation on the document is completed up to a desired part thereof, the reading operation can be stopped by pressing the pause key 40B1. In other words, the range of the image displayed on the LCD 41 at the timing when the pause key 40B1 is pressed is to be determined as the output range of the image data which has been read from the document. Thereafter, the image based on the image data which has been read before the pause key 40B1 is pressed is continuously displayed on the LCD 41 until any one of the determination key 40B2, and the modification keys 40B3, 40B4 is pressed.

FIG. 7B is the view showing the example of the display screen in the case in which the output range of the image data is reduced by pressing the modification key 40B3 after the pause key 40B1 is pressed. An image of one line is deleted from the display screen every time the modification key 40B3 is pressed, based on the processings from "S34" to "S37" in the display-editing operation "S5", so that the modification of the output range of the image data is informed to the operator.

FIG. 7C is the view showing the example of the display screen in the case in which the output range of the image data which has been reduced by pressing the modification key 40B3 is restored (enlarged) by pressing the modification key 40B4. The image is displayed based on the image data corresponding to one line on the display screen every time the modification key 40B4 is pressed, based on the processings "S34", "S42", "S43", and "S37" in display-editing operation "S5", so that the modification (the restoration) of the output range of the image data is informed to the operator. According to the above-described arrangement, the operator can easily modify the output range of the image data which is determined by pressing the pause key 40B1 and reliably recognize the output range of the image data which has been modified.

As described above, in the present embodiment, the reading operation can pause in the middle of reading the document by pressing the pause key 40B1. Further, the image data which has been read from the document up to the position thereof in which the reading operation pauses can be kept in the image memory 23a. Therefore, not only the image data of the whole document, but also the image data of a part of the document (the image data of the operator's desired part of the document) can be selectively outputted. According to the above-described arrangement, the reading operation can be more stably performed than the reading operation that is performed by using the handy scanner while the image data can be partially read from the document.

In the present embodiment, the image reading device constitutes the reading device and the driving system which is provided in the scanner 3 for scanning the document by moving the image-reading unit constituting a moving mechanism for moving the reading device and the document relative to each other.

In the above-described embodiment, one line of the document corresponds to one section of the document. Reading of the image data and displaying of the image are performed in one section, namely, the image data of one line corresponds to the one line data. The one line data corresponds to the image of one section of the document, namely, corresponds to a section of the image data. Apart of the display image displayed on the display device is based on the section of the image data. The parts of the display image respectively corresponding to the sections of the image data.

The control section 20 which is provided in the MFD 1 in the above-described embodiment includes various functional portions for executing the above-described various processings. The functional portions include a read-controlling portion, an image-data storing portion, a display-controlling portion, a command detecting portion, an output-range determining portion, an image-data outputting portion, a receiving-device assigning portion, a range-modification-information detecting portion, and an output-range modifying portion.

The read-controlling portion is one of the functional portions which is configured to conduct a reading operation in which the reading device reads the image of the document while scanning the document by controlling operations of the reading device and the moving mechanism so as to obtain sections of the image data (i.e., one line data) of the document in a reading order sequentially. More specifically, the read-controlling portion mainly executes the processing "S21" which constitutes a part of the reading operation, and the processings "S31" and "S32". Further, the read-controlling portion has a read-resuming controlling portion configured to conduct the reading operation on the following document after the state is established. The read-resuming controlling portion is one of the functional portions for executing the processings from "S21" with respect to the following document when there is the following document, based on the processing "S28".

The image-data storing portion is one of the functional portions which is configured to store, in a memory (i.e., the image memory 23a), the sections of the image data (i.e., one line data) of the document in a reading order sequentially. More specifically, the image-data storing portion mainly executes the processing "S22", i.e., a image-data storing step.

The display-controlling portion is one of the functional portions which is configured to control the display device (i.e., the LCD 41) so as to display the display image based on the sections of the image data (i.e., one line data) in a manner that parts of the display image respectively corresponding to the sections of the image data displayed in the reading order sequentially such that the image of the document appears on the display device. More specifically, the display-controlling portion mainly executes the processing "S24" and "S25", namely, a displaying step. Further, the display-controlling portion has a display-modifying portion which is configured to display at least one of the parts of the display image displayed on the display device which corresponds to the at least one of the section of the image data (i.e., at least an one line data) that has been deleted, in a different manner from the other of the parts of the display image displayed on the display device, when the at least one of the section of the image data is deleted from the sections of the image data stored in the memory by the output-range modifying portion. The display-modifying portion is one of the functional portions for executing the processing "S37".

The command detecting portion is one of the functional portions which is configured to detect a specific command (inputted via the pause key 40B1). More specifically, the command detecting portion mainly executes the processing "S26", namely, a command detecting step.

The output-range determining portion is one of the functional portions which is configured to determine an output range which is a range of output image data to be outputted from the image reading apparatus, the output range being determined based on the sections of the image data corresponding to the display image displayed at a timing when the specific command (inputted via the pause key 40B1) is detected by the command detecting portion. More specifically, the output-range determining portion mainly executes the processings "S31" and "S39", namely, an output-range determining step.

The image-data outputting portion is one of the functional portions which is configured to output the output image data based on the output range. More specifically, the image-data outputting portion mainly executes the processings from "S7" to "S11", "S14" and "S15", namely, an image-data outputting step.

The receiving-device assigning portion is one of the functional portions which is configured to select one of the plurality of image-data receiving devices to which the output image data is outputted from the image reading apparatus. More specifically, the receiving-device assigning portion mainly executes the processing "S5".

The range-modification-information detecting portion is one of the functional portions which is configured to detect a range-modification information which is inputted via the operable portion in order to modify the output range. More specifically, the range-modification-information detecting portion mainly executes the processings "S33" and "S34".

The output-range modifying portion is one of the functional portions which is configured to modify the output range by deleting or adding at least one of the section of the image data (i.e., at least an one line data) which is specified by the range-modification information from or to the sections of the image data which is stored in the memory (i.e., the image memory 23a) when the range-modification information is detected by the range-modification-information detecting portion. More specifically, the output-range modifying portion mainly executes the processings "S35", "S36", and "S41"-"S43".

It is to be understood that the present invention is not limited to the details of the present embodiment illustrated hereinabove, but may be embodied with various changes and modifications without departing from the substance of the present invention.

For example, in the present embodiment, since the detection of the presence of the following document is performed by the document detect sensor 30, the presence of the following document in the reading operation performed on the documents as a plurality of pages is confirmed (S28:Yes) only when the reading operation is performed by the ADF 7. When the reading operation is performed by the FBS, the image data can be read from only a single page of the document. In this case, it is not possible to output a series of the image data with respect to the plurality of pages. Also, in this case, it is not possible to perform the partial reading of the second page document and the following pages by pressing the pause key 40B1.

Instead, when the reading operation is performed by the FBS, the MFD 1 may be configured such that it is possible to output the series of the image data with respect to the plurality of pages and to perform the partial reading of the second page document and following pages by pressing the pause key 40B1. To this end, the MFD 1 may be configured such that setting the number of the total pages of the documents which need to be read is requested before the reading operation is started and such that the MFD 1 is equipped with a memory for memorizing the number of the total pages of the documents which has been set and a counter for counting how many times the reading operation on the document is performed. In this configuration, the processing "S28" for judging the presence of the following document may be arranged such that the presence of the following document is confirmed based on the fact that the number of a repetition of the reading operation counted by the counter reaches the number of the total pages of the documents.

Further, the MFD 1 may be configured such that the determination of the output range of the image data by pressing the pause key 40B1 is limited to a determination in which the reading operation is performed on the single page of the document. More specifically, the processing "S28" for judging whether there are the following documents may not be provided in the display-editing operation "S5". In this case, the output range of the image data is finalized after the reading operation on the single document pauses by the pause key 40B1, and then, the image data of the single document within the finalized output range is immediately outputted to the image-data receiving device.

In the present embodiment, the pause key 40B1, the determination key 40B2, the modification keys 40B3 and 40B4 are individually provided. However, these keys 40B1-40B4, i.e., the group of operation keys 40B, may be substituted by any suitable keys essential for the MFD 1 such as numerical keys. In this instance, because each of the numerical keys does not perform its own function during the reading operation, each of the numerical keys can be used, without any problem, as a suitable one of the operation keys 40B1-40B4. The arrangement eliminates a need to provide the group of operation keys 40B on the operation panel 4, thereby ensuring efficient utilization of a space of the operation panel 4.

In the display-editing operation "S5" in the present embodiment, the output range of the image data can not be modified after the reading operation is completed on the end margin of the document (i e., after the whole document is read). Instead, the display-editing operation "S5" may be arranged such that the MFD 1 waits for inputting of one of the modification keys 40B3, 40B4 for a predetermined time after the reading operation is completed on the end margin of the document. In this instance, the processings may be performed in a similar manner as the processings from "34" to "S37" and the processings from "S41" to "S43" when any one of the modification keys 40B3, 40B4 is pressed, and then the output range of the image data may be determined by pressing the determination key 40B2.

Further, the MFD 1 may be configured such that a speed of the reading operation is changeable (between a high speed and a low speed) and such that the speed of the reading operation is changed depending on an operation by the operator. In this instance, the reading operation may be performed at the high speed in the case in which the image data of the whole document is read while the reading operation may be performed at the low speed in the case in which the image data of the part of the document is read, namely, in the case in which the pause key 40B1 is to be pressed by the operator. According to this configuration, the operator can unerringly judge a timing to press the pause key 40B1 while visually identifying the display which is updated at the low speed on the LCD 41 so that the output range of the image data is reliably determined as desired. Further, the reading operation can be performed, at the high speed, on the documents in which the output range of the image data does not need to be determined. Therefore, it is possible to shorten a required time to perform the whole operation of the MFD 1.

Further, in the display-editing operation "S5" in the present embodiment, the series of the image data of different pages of the documents are sequentially stored in the image memory 23a and the display-image memory 23b. Instead, a management memory for managing the final address of the image data of the end margin of each page of the documents may be provided. In this instance, in outputting the image data to the LCD 41 and the image-data receiving device, the image data may be read out based on the addresses stored in the management memory, and the image based on the image data may be sequentially displayed and outputted.

Further, the image data of the following document is not limited to be sequentially stored so as to be continuous with the final image data of the previous document, but may be stored such that the image data of the following document is spaced apart from the final image data of the previous document by a predetermined space that corresponds to one line data, for instance.

Further, when the determined output range is modified by deleting the image data, a part of the image which corresponds to the image data that has been deleted may be displayed on the LCD 41 in a different manner from the other part of the image. More specifically, a color of the above-described part of the image itself, a font of a text in the part of the image, and a background color of the part of the image may be changed. Further, the part of the image may be blacked out or not displayed, and so on.

What is claimed is:
1. An image reading apparatus, comprising:
 a reading device configured to read an image of a document including at least one sheet to obtain image data of the image;
 a moving mechanism configured to move at least one of the reading device and the document;
 an operable portion capable of being inputted a specific command;
 a read-controlling portion configured to conduct a reading operation in which the reading device reads the image of the document while scanning the document by controlling operations of the reading device and the moving mechanism so as to obtain each section of the image data of one sheet as one of the at least one sheet, wherein parts of the image of the one sheet respectively corresponding to the sections of the image data of the one sheet are read in a reading order;

an image-data storing portion configured to store, in a memory, the sections of the image data of the document in the reading order;

a display device configured to display a display image based on the sections of the image data stored in the image-data storing portion, the display image corresponding to the image of the document;

a display-controlling portion configured to control the display device so as to display the display image in a manner that parts of the display image respectively corresponding to the sections of the image data are displayed in the same order as the reading order;

a command detecting portion configured to detect the specific command;

an output-range determining portion configured to determine an output range which is a range of output image data of the document to be outputted from the image reading apparatus, the output range ranging, from the section of the image data of the document corresponding to the first part of the display image, to the section of the image data of the one sheet corresponding to the last part of the display image, the first part of the display image being a part of the display image corresponding to the section of the image data obtained first by the reading operation of the document, the last part of the display image corresponding to the section of the image data obtained last by the reading operation of the one sheet and being a part of the display image displayed last on the display device at the timing when the specific command is detected; and an image-data outputting portion configured to output sections of the image data included in the output range, and not to output sections of the image data of the one sheet not included in the output range.

2. The image reading apparatus according to claim 1, wherein the display-controlling portion is configured to display, on the display device, each of the parts of the display image at substantially the same time when one of the sections of image data corresponding to the each of the parts of the display image is obtained by the reading operation of the document.

3. The image reading apparatus according to claim 1, wherein the read-controlling portion is configured to stop the reading operation at the timing when the specific command is detected and establish one of (a) a state before the reading operation starts to be performed on the document and (b) a state in which the reading operation is performable on a following sheet that is planned to be read after the one sheet, by activating the moving mechanism to move at least one of the reading device and the one sheet in which the reading operation is stopped.

4. The image reading apparatus according to claim 1 which is configured to be capable of outputting the output image data to a plurality of image-data receiving devices each of which is capable of receiving the output image data, and which further comprises a receiving-device assigning portion configured to select one of the plurality of image-data receiving devices to which the output image data is outputted from the image reading apparatus.

5. The image reading apparatus according to claim 1, wherein the read-controlling portion is configured to stop the reading operation at the timing when the specific command is detected and establish a state in which the reading operation is performable on a following sheet that is planned to be read after the one sheet, by activating the moving mechanism to move at least one of the reading device and the one sheet in which the reading operation is stopped, and wherein the read-controlling portion includes a read-resuming controlling portion configured to conduct the reading operation on the following sheet after the state is established.

6. The image reading apparatus according to claim 5, further comprising:
a sheet introducing mechanism provided in the moving mechanism and configured to introduce sheets each as the sheet one by one to a reading start position at which the reading operation is started; and
a final sheet detecting device configured to detect whether the sheet which is to be introduced to the reading start position by the sheet introducing mechanism is a final sheet,
wherein the read-resuming controlling portion is configured to conduct the reading operation on the following sheet under a condition in which the sheet that is to be introduced to the reading start position is not detected as the final sheet by the final sheet detecting device.

7. The image reading apparatus according to claim 5, wherein the image-data storing portion is configured to keep the sections of the image data stored in a memory when the reading operation is stopped and to store, in the memory, the sections of the image data which is obtained by the reading operation on the following sheet so as to be continuous with the sections of the image data kept in the memory.

8. The image reading apparatus according to claim 7, wherein the image-data outputting portion is configured to output, as the output image data, the sections of the image data stored in the memory, after the reading operation on the sheet which is a final sheet is completed.

9. The image reading apparatus according to claim 5, wherein the display-controlling portion is configured to display, on the display device, the display image of the following sheet in a vicinity of the display image displayed with respect to the sheet on which the reading operation has been performed when the reading operation is performed on the following sheet.

10. The image reading apparatus according to claim 5, wherein the display-controlling portion is configured to display, on the display device, the display images of the following sheet so as to be continuous with the display image displayed with respect to the sheet on which the reading operation has been performed when the reading operation is performed on the following sheet.

11. The image reading apparatus according to claim 1, further comprising:
a range-modification-information detecting portion configured to detect a range-modification information which is inputted via the operable portion in order to modify the output range; and
an output-range modifying portion configured to modify the output range by deleting or adding at least one of the section of the image data which is specified by the range-modification information from or to the sections of the image data which is stored in the memory when the range-modification information is detected by the range-modification-information detecting portion.

12. The image reading apparatus according to claim 11, wherein the output-range determining portion is configured to determine the output range as a range of the sections of the image data which ranges from one of the sections of the image data corresponding to the one of the parts of the display image displayed first on the display device at the timing when the specific command is detected, to another one of the sections of the image data obtained last by the reading operation of the sheet, and wherein the output-range modifying portion is configured to modify the output range by modifying said one of the sections of the image data corresponding to said one of the parts of the display image.

13. The image reading apparatus according to claim 11, wherein the display-controlling portion includes a display-modifying portion configured to display at least one of the parts of the display image displayed on the display device which corresponds to the at least one of the section of the image data that has been deleted, in a different manner from the other of the parts of the display image displayed on the display device, when the at least one of the section of the image data is deleted from the sections of the image data stored in the memory by the output-range modifying portion.

14. The image reading apparatus according to claim 1, wherein a starting section of the image data in the output range is a section of the image data obtained first in the reading operation at the timing when the reading device starts to read the at least one sheet, and a stopping section of the image data in the output range is a section of the image data obtained at a timing when the specific command is detected by the command detecting portion, and wherein the stopping section corresponds to anyone of a plurality of sections of a stopping sheet of the at least one sheet, the stopping sheet being read at the timing when the specific command is detected by the command detecting portion.

15. A non-transitory computer readable medium storing a control program for controlling an image reading apparatus comprising a reading device configured to read an image of a document including at least one sheet to obtain image data of the image, a moving mechanism configured to move at least one of the reading device and the document, an operable portion capable of being inputted a specific command, a read-controlling portion configured to conduct a reading operation in which the reading device reads the image of the document while scanning the document by controlling operations of the reading device and the moving mechanism so as to obtain each section of the image data of one sheet as one of the at least one sheet, wherein parts of the image of the one sheet respectively corresponding to the sections of the image data of the one sheet are read in a reading order, and a display device configured to display a display image based on the sections of the image data stored in the image-data storing portion, the display image corresponding to the image of the document, the control program comprising:

an image-data storing step of storing, in a memory, the sections of the image data of the document in the reading order;

a displaying step of displaying the display image in a manner that parts of the display image respectively corresponding to the sections of the image data are displayed in the same order as the reading order;

a command detecting step of detecting the specific command;

an output-range determining step of determining an output range which is a range of output image data of the document to be outputted from the image reading apparatus, the output range ranging, from the section of the image data of the document corresponding to the first part of the display image, to the section of the image data of the one sheet corresponding to the last part of the display image, the first part of the display image being a part of the display image corresponding to the section of the image data obtained first by the reading operation of the document, the last part of the display image corresponding to the section of the image data obtained last by the reading operation of the one sheet and being a part of the display image displayed last on the display device at the timing when the specific command is detected; and an image-data outputting step of outputting the output sections of the image data included in the output range, and not to output sections of the image data of the one sheet not included in the output range.

16. A method for reading an image by using an image reading apparatus comprising a reading device configured to read an image of a document including at least one sheet to obtain image data of the image, a moving mechanism configured to move at least one of the reading device and the document, an operable portion capable of being inputted a specific command, a read-controlling portion configured to conduct a reading operation in which the reading device reads the image of the document while scanning the document by controlling operations of the reading device and the moving mechanism so as to obtain each section of the image data of the one sheet as one of the at least one sheet, wherein parts of the image of the one sheet respectively corresponding to the sections of the image data of the one sheet are read in a reading order, and a display device configured to display a display image based on the sections of the image data stored in the image-data storing portion, the display image corresponding to the image of the document, the method comprising:

storing, in a memory, the sections of the image data of the document in the reading order;

displaying the display image in a manner that parts of the display image respectively corresponding to the sections of the image data are displayed in the same order as the reading order;

detecting the specific command;

determining an output range which is a range of output image data of the document to be outputted from the image reading apparatus, the output range ranging, from the section of the image data of the document corresponding to the first part of the display image, to the section of the image data of the one sheet corresponding to the last part of the display image, the first part of the display image being a part of the display image corresponding to the section of the image data obtained first by the reading operation of the document, the last part of the display image corresponding to the section of the image data obtained last by the reading operation of the one sheet and being a part of the display image displayed last on the display device at the timing when the specific command is detected; and outputting the output sections of the image data included in the output range, and not to output sections of the image data of the one sheet not included in the output range.

\* \* \* \* \*